US009280447B2

(12) United States Patent
Farrell et al.

(10) Patent No.: US 9,280,447 B2
(45) Date of Patent: Mar. 8, 2016

(54) MODIFYING RUN-TIME-INSTRUMENTATION CONTROLS FROM A LESSER-PRIVILEGED STATE

(75) Inventors: Mark S. Farrell, Pleasant Valley, NY (US); Charles W. Gainey, Jr., Poughkeepsie, NY (US); Chung-Lung K. Shum, Wappingers Falls, NY (US); Timothy J. Slegel, Staatsburg, NY (US)

(73) Assignee: International Business Machines Corporation, Armonk, NY (US)

( * ) Notice: Subject to any disclaimer, the term of this patent is extended or adjusted under 35 U.S.C. 154(b) by 937 days.

(21) Appl. No.: 13/422,598

(22) Filed: Mar. 16, 2012

(65) Prior Publication Data

US 2013/0246744 A1     Sep. 19, 2013

(51) Int. Cl.
*G06F 11/36* (2006.01)
*G06F 9/30* (2006.01)

(52) U.S. Cl.
CPC ........ *G06F 11/3644* (2013.01); *G06F 9/30076* (2013.01); *G06F 9/30101* (2013.01); *G06F 11/3636* (2013.01); *G06F 11/3648* (2013.01)

(58) Field of Classification Search
CPC ............ G06F 11/3644; G06F 11/3648; G06F 9/30076; G06F 9/30101; G06F 11/3636
See application file for complete search history.

(56) References Cited

U.S. PATENT DOCUMENTS

| | | | |
|---|---|---|---|
| 4,821,178 A | 4/1989 | Levin et al. | |
| 5,151,981 A | 9/1992 | Westcott et al. | |
| 5,341,500 A | 8/1994 | Moyer et al. | |
| 5,371,894 A | 12/1994 | DiBrino | |
| 5,386,565 A | 1/1995 | Tanaka et al. | |
| 5,491,793 A | 2/1996 | Somasundaram et al. | |

(Continued)

FOREIGN PATENT DOCUMENTS

| | | |
|---|---|---|
| EP | 0257241 | 3/1988 |
| EP | 0919919 | 6/1999 |

(Continued)

OTHER PUBLICATIONS

"IA-32 Intel Architecture Software Developer's Manual"; vol. 2B, pp. 4-202, 4-203, 4-359, 4-360; vol. 3, pp. 15-29, 15-30, 15-39—15-43; Jun. 2005.*

(Continued)

*Primary Examiner* — Benjamin Geib
(74) *Attorney, Agent, or Firm* — Cantor Colburn LLP; William A. Kinnaman, Jr.

(57) ABSTRACT

Embodiments of the invention relate to modifying run-time-instrumentation controls (MRIC) from a lesser-privileged state. The MRIC instruction is fetched. The MRIC instruction includes the address of a run-time-instrumentation control block (RICCB). The RICCB is fetched based on the address included in the MRIC instruction. The RICCB includes values for modifying a subset of the processor's run-time-instrumentation controls. The subset of run-time-instrumentation controls includes a runtime instrumentation program buffer current address (RCA) of a runtime instrumentation program buffer (RIB) location. The RIB holds run-time-instrumentation information of the events recognized by the processor during program execution. The values of the RICCB are loaded into the run-time-instrumentation controls. Event information is provided to the RIB based on the values that were loaded in the run-time-instrumentation control.

14 Claims, 17 Drawing Sheets

(56) References Cited

U.S. PATENT DOCUMENTS

| | | | |
|---|---|---|---|
| 5,553,293 A | 9/1996 | Andrews et al. | |
| 5,608,866 A | 3/1997 | Horikawa | |
| 5,675,768 A | 10/1997 | Tran et al. | |
| 5,675,817 A | 10/1997 | Moughanni et al. | |
| 5,737,516 A | 4/1998 | Circello et al. | |
| 5,768,500 A | 6/1998 | Agrawal et al. | |
| 5,796,939 A | 8/1998 | Berc et al. | |
| 5,809,325 A | 9/1998 | Hinton et al. | |
| 5,944,841 A | 8/1999 | Christie | |
| 5,960,198 A | 9/1999 | Roediger et al. | |
| 5,964,893 A | 10/1999 | Circello et al. | |
| 5,978,902 A | 11/1999 | Mann | |
| 5,987,249 A | 11/1999 | Grossman et al. | |
| 6,077,312 A | 6/2000 | Bates et al. | |
| 6,094,729 A | 7/2000 | Mann | |
| 6,145,123 A | 11/2000 | Torrey et al. | |
| 6,154,818 A * | 11/2000 | Christie | 711/163 |
| 6,158,049 A | 12/2000 | Goodwin et al. | |
| 6,161,196 A | 12/2000 | Tsai | |
| 6,163,840 A | 12/2000 | Chrysos et al. | |
| 6,216,237 B1 | 4/2001 | Klemm et al. | |
| 6,243,836 B1 | 6/2001 | Whalen | |
| 6,321,329 B1 | 11/2001 | Jaggar et al. | |
| 6,378,125 B1 | 4/2002 | Bates et al. | |
| 6,519,766 B1 | 2/2003 | Barritz et al. | |
| 6,539,500 B1 | 3/2003 | Kahle et al. | |
| 6,631,518 B1 | 10/2003 | Bortnikov et al. | |
| 6,634,020 B1 | 10/2003 | Bates et al. | |
| 6,769,054 B1 | 7/2004 | Sahin et al. | |
| 6,918,065 B1 | 7/2005 | Edwards et al. | |
| 6,918,110 B2 | 7/2005 | Hundt et al. | |
| 6,961,927 B1 | 11/2005 | Erb et al. | |
| 6,978,462 B1 | 12/2005 | Adler et al. | |
| 7,013,456 B1 | 3/2006 | Van Dyke et al. | |
| 7,047,520 B2 | 5/2006 | Moore et al. | |
| 7,047,521 B2 | 5/2006 | Bunnell | |
| 7,080,289 B2 | 7/2006 | Swaine et al. | |
| 7,103,877 B1 | 9/2006 | Arnold et al. | |
| 7,137,105 B2 | 11/2006 | Madsen et al. | |
| 7,181,600 B1 | 2/2007 | Uhler | |
| 7,239,980 B2 | 7/2007 | DeWitt, Jr. et al. | |
| 7,500,152 B2 | 3/2009 | Moyer et al. | |
| 7,716,335 B2 | 5/2010 | Dinker et al. | |
| 7,735,072 B1 | 6/2010 | Altman et al. | |
| 7,814,466 B2 | 10/2010 | Chen et al. | |
| 7,870,438 B2 | 1/2011 | Bartik et al. | |
| 7,904,460 B2 | 3/2011 | Armour et al. | |
| 7,962,314 B2 | 6/2011 | Chernoff | |
| 8,141,052 B2 | 3/2012 | Guarraci | |
| 8,307,345 B2 | 11/2012 | Sunkara et al. | |
| 8,312,253 B2 | 11/2012 | Circello et al. | |
| 8,473,925 B2 | 6/2013 | Gagliardi et al. | |
| 8,572,577 B2 | 10/2013 | Bates et al. | |
| 8,707,314 B2 | 4/2014 | Gummaraju et al. | |
| 2002/0046305 A1 | 4/2002 | Babaian et al. | |
| 2003/0005423 A1 | 1/2003 | Chen et al. | |
| 2003/0084375 A1 | 5/2003 | Moore et al. | |
| 2003/0149961 A1 | 8/2003 | Kawai et al. | |
| 2003/0154430 A1 | 8/2003 | Allen et al. | |
| 2004/0019886 A1 | 1/2004 | Berent et al. | |
| 2004/0133882 A1 | 7/2004 | Angel et al. | |
| 2004/0139304 A1 | 7/2004 | Arimilli et al. | |
| 2004/0268315 A1 | 12/2004 | Gouriou et al. | |
| 2005/0034017 A1 | 2/2005 | Airaud et al. | |
| 2005/0120337 A1 | 6/2005 | Serrano et al. | |
| 2005/0198466 A1 | 9/2005 | Estlick et al. | |
| 2005/0228631 A1 | 10/2005 | Maly et al. | |
| 2006/0101416 A1 | 5/2006 | Callahan et al. | |
| 2006/0184832 A1 | 8/2006 | Floyd et al. | |
| 2006/0190930 A1 | 8/2006 | Hecht et al. | |
| 2006/0236067 A1 | 10/2006 | Attinella et al. | |
| 2006/0242627 A1 | 10/2006 | Wygodny et al. | |
| 2006/0248515 A1 | 11/2006 | Qadeer et al. | |
| 2006/0259822 A1 | 11/2006 | Swoboda | |
| 2006/0259824 A1 | 11/2006 | Sohm et al. | |
| 2006/0259830 A1 | 11/2006 | Blevin et al. | |
| 2006/0267818 A1 | 11/2006 | Agarwala | |
| 2006/0277441 A1 | 12/2006 | Edgar et al. | |
| 2007/0006172 A1 | 1/2007 | Swoboda et al. | |
| 2007/0079177 A1 | 4/2007 | Spirakis et al. | |
| 2007/0143755 A1 | 6/2007 | Sahu et al. | |
| 2007/0186056 A1 | 8/2007 | Saha et al. | |
| 2007/0214342 A1 | 9/2007 | Newburn et al. | |
| 2007/0260849 A1 | 11/2007 | Chen et al. | |
| 2007/0261032 A1 | 11/2007 | Chen et al. | |
| 2007/0261033 A1 | 11/2007 | Chen et al. | |
| 2007/0288900 A1 | 12/2007 | Lev et al. | |
| 2008/0005730 A1 | 1/2008 | Inamdar | |
| 2008/0098364 A1 | 4/2008 | Gray-Donald et al. | |
| 2008/0114806 A1 | 5/2008 | Kosche | |
| 2008/0189529 A1 | 8/2008 | Bohizic et al. | |
| 2008/0222382 A1 | 9/2008 | Snyder | |
| 2008/0250275 A1 | 10/2008 | Walker | |
| 2008/0250397 A1 | 10/2008 | Dahms et al. | |
| 2009/0037887 A1 | 2/2009 | Chavan | |
| 2009/0113398 A1 | 4/2009 | Birkill et al. | |
| 2009/0150890 A1 | 6/2009 | Yourst | |
| 2009/0178036 A1 | 7/2009 | Levine | |
| 2009/0204794 A1 | 8/2009 | Busaba et al. | |
| 2009/0210752 A1 | 8/2009 | Bartik et al. | |
| 2009/0320001 A1 | 12/2009 | Bates et al. | |
| 2010/0064279 A1 | 3/2010 | Stewart | |
| 2010/0077143 A1 | 3/2010 | Reid et al. | |
| 2010/0088771 A1 | 4/2010 | Heller et al. | |
| 2010/0146220 A1 | 6/2010 | Panchenko et al. | |
| 2010/0191917 A1 | 7/2010 | Archer et al. | |
| 2010/0229043 A1 | 9/2010 | Saha et al. | |
| 2010/0242025 A1 | 9/2010 | Yamazaki et al. | |
| 2010/0281464 A1 | 11/2010 | Vajapeyam | |
| 2010/0293342 A1 | 11/2010 | Morfey et al. | |
| 2010/0312992 A1 | 12/2010 | Wakabayashi et al. | |
| 2010/0318994 A1 | 12/2010 | Holmberg et al. | |
| 2011/0145498 A1 | 6/2011 | Taillefer et al. | |
| 2011/0145512 A1 | 6/2011 | Adl-Tabatabai et al. | |
| 2011/0154298 A1 | 6/2011 | Alexander et al. | |
| 2011/0154299 A1 | 6/2011 | Kim et al. | |
| 2011/0173588 A1 | 7/2011 | Salapura et al. | |
| 2011/0283264 A1 | 11/2011 | Gagliardi | |
| 2011/0283265 A1 | 11/2011 | Gagliardi et al. | |
| 2011/0302569 A1 | 12/2011 | Kunze et al. | |
| 2011/0314342 A1 | 12/2011 | Gilkerson et al. | |
| 2012/0167057 A1 | 6/2012 | Schmich et al. | |
| 2012/0311273 A1 | 12/2012 | Marathe et al. | |

FOREIGN PATENT DOCUMENTS

| | | |
|---|---|---|
| EP | 2048578 | 4/2009 |
| JP | 64021546 A | 1/1989 |
| JP | 1145736 A | 6/1989 |
| JP | 7013806 A | 1/1995 |
| JP | 8050556 A | 2/1996 |
| JP | 9265407 A | 10/1997 |
| JP | 9282196 A | 10/1997 |
| JP | 2001051874 | 2/2001 |
| JP | 2002252163 | 9/2002 |
| JP | 2002342114 | 11/2002 |
| JP | 2010086520 A | 4/2010 |
| WO | WO2007145903 | 12/2007 |
| WO | WO2010144757 | 12/2010 |

OTHER PUBLICATIONS

U.S. Appl. No. 13/422,588, Non-Final Office Action dated Jan. 15, 2014, 43 pages.
U.S. Appl. No. 13/788,490, Non-Final Office Action dated Jan. 16, 2014, 31 pages.
U.S. Appl. No. 13/422,596, Non-Final Office Action dated Jan. 31, 2014, 39 pages.
Anonymous Disclosed: "Embedded Trace Macrocell—ETMv1.0 to ETMv3.5" Architecture Specification, ARM, Jan. 2011, pp. 1-420.
European Application No. 13760324.7 Extended European Search Report dated Jan. 21, 2015, 7 pages.
European Application No. 13761271.9 Extended European Search Report dated Mar. 2, 2015 for POU920120002EP1, 7 pages.

(56) References Cited

OTHER PUBLICATIONS

European Patent Application No. 13760503.6 Extended European Search Report dated Mar. 6, 2015, 6 pages.
European Patent Application No. 13760531.7 Extended European Search Report dated Mar. 9, 2015; 7 pages.
European Patent Application No. 13761846.8 Supplemental EP Search Report Mailed Mar. 9, 2015, 7 pages.
European Patent Application No. 12762008.4 Extended European Search Report dated Mar. 16, 2015, 7 pages.
Gschwind, et al., "Binary Translation and Architecture Convergence Issues for IBM System/390," International Conference on Supercomputing, Conference Proceedings, ACM, New York, May 8, 2000, 12 pages.
BJ Bruetsch, et al., Hardward Assist for Program Event Recording, http://www.ip.com/pubview/IPCOM000059699D; Jan. 1, 1986, 3 pages.
RJ Bullions, et al., Dynamic Enabling/Disabiling of Program Event Recording Range Compare, IBM Technical Disclosure Bulletin, vol. 20, No. 9, 1978, 3 pages.
C.R. Conklin, et al., Forced Enablement of Program Event Recording for a Guest, Including a BC-Mode Guest, http://www.ip.com/pubview/IPCOM000117262D; Jan. 1, 1996, 3 pages.
K. Getzlaff, et al., Hardware-Implemented Program Event Recording, http://ww.ip.com;pubview/IPCOM000121669D; Sep. 1, 1991, 4 pages.
Matthew C. Merten et al. "A Hardware-Driven Profiling Scheme for Identifying Program Hot Spots to Support Runtime Optimization"; Appears in Proceedings of the 26th Annual Intl. Symposium on Compjer Architecture (ISCA); pp. 136-147; May 1999.
FE Sakalay, Program Event Recording, IBM Technical Disclosure Bulletin, vol. 15, No. 4, Sep. 1972, 3 pages.
Z/Architecture: "Principles of Operation"; Sixth Edition, Apr. 2007, Publication No. SA22-7832-08, copyright IBM Corp. pp. 1-700, 721-1496.
U.S. Appl. No. 13/422,563, Non-Final Office Action dated Mar. 27, 2014, 41 pages.
U.S. Appl. No. 13/422,546; Non-Final Office Action; Date Filed: 3116/2012; Date Mailed: Apr. 15, 2014; 32 pages.
U.S. Appl. No. 13/422,532, Non-Final Office Action dated Jun. 3, 2014, 34 pages.
U.S. Appl. No. 13/422,542, Non-Final Office Action dated May 23, 2014, 31 pages.
U.S. Appl. No. 13/784,868, Non-Final Office Actin dated May 14, 2014, 33 pages.
U.S. Appl. No. 13/784,872, Non-Final Office Action dated May 8, 2014, 32 pages.
U.S. Appl. No. 13/422,596, Final Office Action dated Jun. 18, 2014, 28 pages.
International Search Report for International Application No. PCT/JP2013/001013; International Filing Date Feb. 22, 2013; Date of Mailing: May 14, 2013; 2 pages.
International Search Report for International Application No. PCT/JP2013/001240; International Filing Date Feb. 23, 2013; Date of Mailing: May 14, 2013; 3 pages.
International Search Report for International Application No. PCT/JP2013/001262; International Filing Date Mar. 1, 2013; Date of Mailing: May 7, 2013; 2 pages.
International Search Report for International Application No. PCT/JP2013/001264; International Filing Date Mar. 1, 2013; Date of Mailing: May 14, 2013; 3 pages.
International Search Report for International Application No. PCT/JP2013/001268; International Filing Date Mar. 1, 2013; Date of Mailing: May 7, 2013; 2 pages.
International Application No. PCT/JP2013/001009 International Search Report and Written Opinion dated May 14, 2013, 5 pages.
International Application No. PCT/JP2013/001016 International Search Report and Written Opinion dated May 14, 2013, 6 pages.
International Application No. PCT/JP2013/001769 International Search Report and Written Opinion dated May 14, 2013, 5 pages.
International Application No. PCT/JP2013/001412 International Search Report and Written Opinion dated May 14, 2013, 6 pages.
International Application No. PCT/JP2013/001464 International Search Report and Written Opinion dated May 14, 2013, 5 pages.
Written Opinion of the International Searching Authority for International Application No. PCT/JP2013/001013 mailed May 14, 2013; 3 pages.
Written Opinion of the International Searching Authority for International Application No. PCT/JP2013/001240 mailed May 14, 2013; 3 pages.
Written Opinion of the International Searching Authority for International Application No. PCT/JP2013/001262 mailed May 7, 2013; 3 pages.
Written Opinion of the International Searching Authority for International Application No. PCT/JP2013/001264 mailed May 14, 2013; 3 pages.
Written Opinion of the International Searching Authority for International Application No. PCT/JP2013/001268 mailed May 7, 2013; 3 pages.
Yoshioka Hirotaka, Developing memory profiling tools, Interface, 2003.08.01, Vo. 29, No. 8, pp. 132-142.
U.S. Appl. No. 13/785,089; Notice of Allowance; Date Filed: Mar. 5, 2013; Date Mailed: Jul. 29, 2014; 31 pages.
U.S. Appl. No. 13/422,538; Notice of Allowance: Date Filed Mar. 16, 2012; Date Mailed: Jul. 29, 2014; 33 pages.
U.S. Appl. No. 13/422,546; Notice of Allowance; Date Filed: Mar. 16, 2012; Date Mailed: Aug. 4, 2014; 16 pages.
U.S. Appl. No. 13/784,872, Notice of Allowance dated Sep. 19, 2014, 43 pages.
U.S. Appl. No. 13/422,577, Non-Final Office Action; Date Filed Mar. 16, 2014; Date Mailed: Jul. 29, 2014; 58 pages.
U.S. Appl. No. 13/784,868; Final Office Action; Date Filed: 2013; Date Mailed: Oct. 1, 2014; 46 pages.
U.S. Appl. No. 13/422,550 Non-Final Office Action dated Aug. 15, 2014, 46 pages.
U.S. Appl. No. 13/422,552 Non-Final Office Action dated Aug. 27, 2014, 55 pages.
U.S. Appl. No. 13/422,588 Notice of Allowance dated Jul. 28, 2014, 74 pages.
U.S. Appl. No. 13/422,596 Notice of Allowance dated Oct. 7, 2014, 19 pages.
U.S. Appl. No. 13/422,563 Final Office Action dated Aug. 14, 2014, 39 pages.
U.S. Appl. No. 13/788,490 Notice of Allowance dated Aug. 1, 2014, 27 pages.
POU920110231EP1 Extended EP Search Report Mailed Nov. 12, 2014; 7 pages.
U.S. Appl. No. 13/422,542 Notice of Allowance dated Oct. 24, 2014, 25 pages.
U.S. Appl. No. 13/422,577; Final Office Action; Date Filed: Mar. 16, 2012; Date Mailed: Dec. 15, 2014; 20 pages.
U.S. Appl. No. 13/784,868; Final Office Action; Date Filed: 3/512013; Date Mailed: Nov. 1, 2014; 46 pages.
U.S. Appl. No. 13/788,368 Non-Final Office Action dated Nov. 18, 2014, 47 pages.
U.S. Appl. No. 13/422,532, Notice of Allowance dated Nov. 3, 2014, 32 pages.
International Application No. PCT/JP2013/001224; International Search Report and Written Opinion dated May 7, 2013, 7 pages.
International Application No. PCT/JP2013/001267, International Search Report and Written Opinion dated May 14, 2013, 8 pages.
U.S. Appl. No. 13/422,538; Non-Final Office Action; Date Filed Mar. 16, 2012; Date Mailed Jan. 3, 2014; 32 pages.
U.S. Appl. No. 13/785,089; Non-Final Office Action; Date Filed: Mar. 5, 2013; Date Mailed Jan. 3, 2014; 28 pages.
EP Application No. 13760362.7 Extended European Search Report dated Apr. 8, 2015, 5 pages.
EP Application No. 13761389.9 Extended European Search Report dated Apr. 8, 2015, 8 pages.
European Application No. 13760760.2 Extended European Search Report dated Mar. 30, 2015, 8 pages.
U.S. Appl. No. 13/422,538; Notice of Allowance: Date Filed: Mar. 16, 2012; Date Mailed: Apr. 6, 2015; 26 pages.

(56) References Cited

OTHER PUBLICATIONS

U.S. Appl. No. 13/788,490; Notice of Allowance; Date Filed: Mar. 7, 2013, Date Mailed: Apr. 1, 2015; 20 pages.
U.S. Appl. No. 13/422,577; Notice of Allowance, Date Filed: Mar. 16, 2012; Date Mailed: Jul. 10, 2015; 12 pages.
U.S. Appl. No. 13/422,589; Non-Final Office Action; Date Filed: Mar. 16, 20112; Date Mailed: May 11, 2015; 72 pages.
U.S. Appl. No. 13/784,861; Non Final Office Action; Date Filed: Mar. 5, 2013; Date Mailed: May 15, 2015; 66 pages.
U.S. Appl. No. 13/785,089; Notice of Allowance; Date Filed: Mar. 5, 2013; Date Mailed: Apr. 24, 2015; 34 pages.
U.S. Appl. No. 13/788,368 Final Office Action dated May 12, 2015, 25 pages.
U.S. Appl. No. 13/790,157; Non-Final Office Action; Date Filed: Mar. 8, 2013; Date Mailed: May 20, 2015; 87 pages.
U.S. Appl. No. 13/792,268; Non-Final Office Action; Date Filed: Mar. 11, 2013; Date Mailed: May 29, 2015; 103 pages.
U.S. Appl. No. 13/792,276; Non-Final Office Action, Date Filed: Mar. 11, 2013; Date Mailed: May 14, 2015; 76 pages.
U.S. Appl. No. 13/792,283; Non-Final Office Action, Date Filed: Mar. 11, 2013; Date Mailed May 7, 2015; 86 pages.
U.S. Appl. No. 13/792,290; Non-Final Office Action, Date Filed: Mar. 11, 2013; Date Mailed: Jun. 5, 2015; 80 pages.
U.S. Appl. No. 13/422,546; Notice of Allowance, Date Filed: Mar. 11, 2012; Date Mailed: Jun. 8, 2015; 17 pages.
U.S. Appl. No. 13/784,863, Non Final Office Action; Date Filed Mar. 5, 2013; Date Mailed: May 15, 2015; 60 pages.
Extended European Search Report, POU920120015EP1, Mailing Date: Jun. 25, 2015; 8 pages.
Hassan Shojania, "Hardware-based performance monitoring with VTune Performance Analyzerunder Linux", 2003, pp. 1-12.
U.S. Appl. No. 13/788,368 Non-Final Office Action dated Sep. 9, 2015, 22 pages.
William E. Cohen, "Tuning Programs with OProfile", Wide Open Magazine, 2004, pp. 53-61.

\* cited by examiner

1200

| Record No. | Record Type(s) | Section | |
|---|---|---|---|
| 0 | Begin, Timestamp | Header | 1202 |
| 1 | Emit, TX Abort, Call, Return, Branch, Filler | Body | 1204 |
| 2 | | | |
| 3 | | | |
| $R_{RG}-R_{NC}$ (=4) | | | |
| $R_{RG}-R_{NC}+1$ (=5) | Extra, Model-Dependent | Extra | 1206 |
| $R_{RG}-2$ (=6) | | | |
| $R_{RG}-1$ | Instruction | Footer | 1208 |

FIG. 12

MODIFYING RUN-TIME-INSTRUMENTATION CONTROLS FROM A LESSER-PRIVILEGED STATE

BACKGROUND

The present invention relates generally to processing within a computing environment, and more specifically, to modifying run-time-instrumentation controls from a lesser-privileged state.

Computer processors execute programs, or instruction streams using increasingly complex branch prediction and instruction caching logic. These processes have been introduced to increase instruction throughput, and therefore processing performance. The introduction of logic for improving performance makes it difficult to predict with certainty how a particular software application will execute on the computer processor. During the software development process there is often a balance between functionality and performance. Software is executed at one or more levels of abstraction from the underlying hardware that is executing the software. When hardware is virtualized, an additional layer of abstraction is introduced. With the introduction of performance enhancing logic, and the various layers of abstraction it is difficult to have a thorough understanding of what is actually occurring at the hardware level when a program is executing. Without this information, software developers use more abstract methods, such as execution duration, memory usage, number of threads, etc., for optimizing the software application.

When hardware specific information is available, it is typically provided to a developer after the fact and it is provided in aggregate, at a high level, and/or interspersed with the activity of other programs, and the operating system, making it difficult to identify issues that may be impacting the efficiency and accuracy of the software application.

SUMMARY

Embodiments include a system and computer program product for modifying run-time-instrumentation controls (MRIC) from a lesser-privileged state. The MRIC instruction is fetched. The MRIC instruction includes the address of a run-time-instrumentation control block (RICCB). The RICCB is fetched based on the address included in the MRIC instruction. The RICCB includes values for modifying a subset of the processor's run-time-instrumentation controls. The subset of run-time-instrumentation controls includes a runtime instrumentation program buffer current address (RCA) of a runtime instrumentation program buffer (RIB) location. The RIB holds run-time-instrumentation information of the events recognized by the processor during program execution. The values of the RICCB are loaded into the run-time-instrumentation controls. Event information is provided to the RIB based on the values that were loaded in the run-time-instrumentation control.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 12 depicts a reporting group in accordance with an embodiment; and

DETAILED DESCRIPTION

An embodiment of the present invention is a system, method and computer program product for updating a subset of run-time-instrumentation controls from a lesser-privileged state. In an embodiment, a lesser-privileged state program is allowed to modify most or all of the run-time-instrumentation controls based on the validity of the current run-time-instrumentation controls, the current state of the run-time-instrumentation controls, and based on a flag (K) indicating that lesser-privileged state configuration is allowed. The lesser-privileged state program executes a modify run-time-instrumentation controls (MRIC) instruction to update the run-time-instrumentation controls. Although the MRIC instruction allows the update of a large number of run-time-instrumentation controls, based on the permission settings of the run-time-instrumentation controls, most of the run-time-instrumentation controls may be updated by the lesser privileged state program using the MRIC instruction.

Figure 1A:
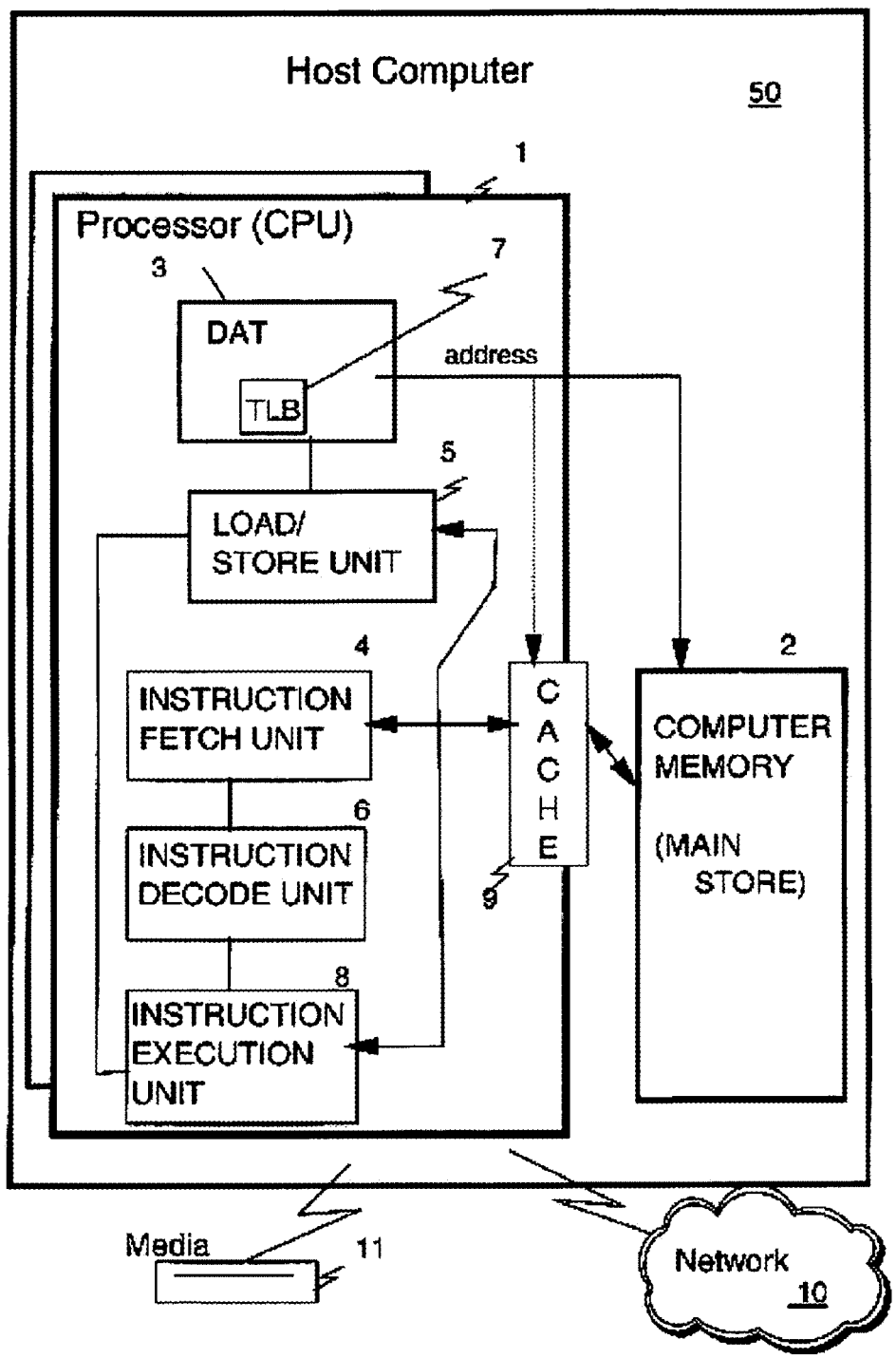
FIG. 1A is a diagram depicting an example host computer system in an embodiment.

FIG. 1A, depicts the representative components of a host computer system 50 in an embodiment. Other arrangements of components may also be employed in a computer system. The representative host computer system 50 comprises one or more processors 1 in communication with main store (computer memory) 2 as well as I/O interfaces to storage devices 11 and networks 10 for communicating with other computers or SANs and the like. The processor 1 is compliant with an architecture having an architected instruction set and architected functionality. The processor 1 may have dynamic address translation (DAT) 3 for transforming program addresses (virtual addresses) into a real address in memory. A DAT 3 typically includes a translation lookaside buffer (TLB) 7 for caching translations so that later accesses to the block of computer memory 2 do not require the delay of address translation. Typically a cache 9 is employed between the computer memory 2 and the processor 1. The cache 9 may be hierarchical having a large cache available to more than one CPU and smaller, faster (lower level) caches between the large cache and each CPU. In some embodiments, the lower level caches are split to provide separate low level caches for instruction fetching and data accesses. In an embodiment, an instruction is fetched from the computer memory 2 by an instruction fetch unit 4 via the cache 9. The instruction is decoded in an instruction decode unit 6 and dispatched (with other instructions in some embodiments) to instruction execution units 8. Typically several instruction execution units 8 are employed, for example an arithmetic execution unit, a floating point execution unit and a branch instruction execution unit. The instruction is executed by the instruction execution unit 8, accessing operands from instruction specified registers or the computer memory 2 as needed. If an operand is to be accessed (loaded or stored) from the computer memory 2, the load store unit 5 typically handles the access under control of the instruction being executed. Instructions may be executed in hardware circuits or in internal microcode (firmware) or by a combination of both.

Figure 1B:
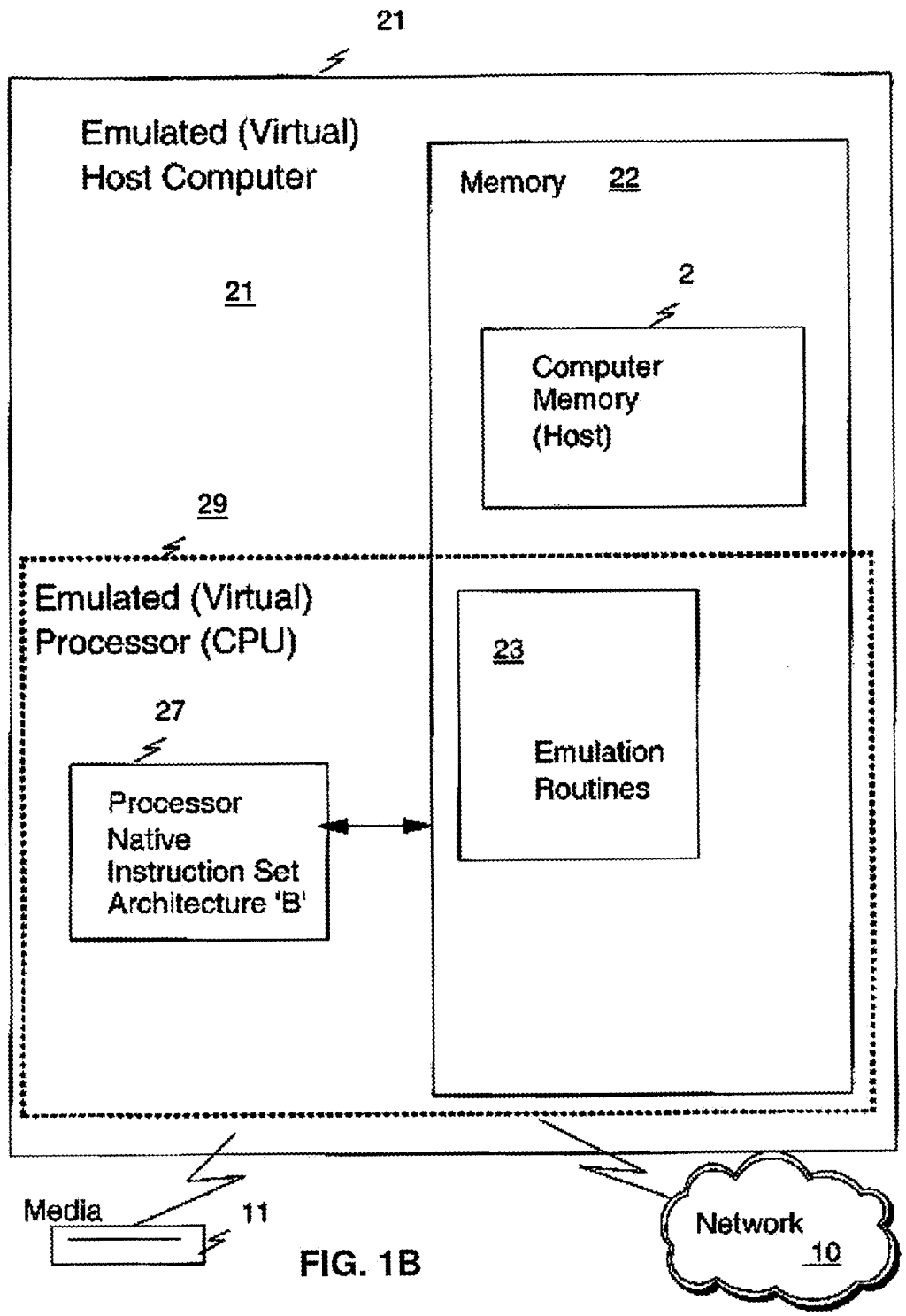
FIG. 1B is a diagram depicting an example emulation host computer system in an embodiment.

In FIG. 1B, depicts an emulated host computer system 21 is provided that emulates a host computer system of a host architecture, such as the host computer system 50 of FIG. 1. In the emulated host computer system 21, a host processor (CPU) 1 is an emulated host processor (or virtual host processor) 29, and comprises a native processor 27 having a different native instruction set architecture than that of the processor 1 of the host computer system 50. The emulated host computer system 21 has memory 22 accessible to the native processor 27. In an embodiment, the memory 22 is partitioned into a computer memory 2 portion and an emulation routines memory 23 portion. The computer memory 2 is available to programs of the emulated host computer system 21 according to the host computer architecture. The native processor 27 executes native instructions of an architected instruction set of an architecture other than that of the emulated processor 29, the native instructions obtained from the emulation routines memory 23, and may access a host instruction for execution from a program in the computer memory 2 by employing one or more instruction(s) obtained in a sequence & access/decode routine which may decode the host instruction(s) accessed to determine a native instruction execution routine for emulating the function of the host instruction accessed. Other facilities that are defined for the host computer system 50 architecture may be emulated by architected facilities routines, including such facilities as general purpose registers, control registers, dynamic address translation and input/output (I/O) subsystem support and processor cache for example. The emulation routines may also take advantage of function available in the native processor 27 (such as general registers and dynamic translation of virtual addresses) to improve performance of the emulation routines. Special hardware and off-load engines may also be provided to assist the native processor 27 in emulating the function of the host computer system 50.

In a mainframe, architected machine instructions are used by programmers, usually today "C" programmers often by way of a compiler application. These instructions stored in the storage medium may be executed natively in a z/Architecture IBM Server, or alternatively in machines executing other architectures. They can be emulated in the existing and in future IBM mainframe servers and on other machines of IBM (e.g. pSeries® Servers and xSeries® Servers). They can be executed in machines running Linux on a wide variety of machines using hardware manufactured by IBM®, Intel®, AMD™, Sun Microsystems and others. Besides execution on that hardware under a Z/Architecture®, Linux can be used as well as machines which use emulation by Hercules, UMX, Fundamental Software, Inc. (FSI) or Platform Solutions, Inc. (PSI), where generally execution is in an emulation mode. In emulation mode, emulation software is executed by a native processor to emulate the architecture of an emulated processor.

One or more of the components of the emulated host computer system 21 are further described in "IBM® z/Architecture Principles of Operation," Publication No. SA22-7932-08, 9th Edition, August, 2010 which is hereby incorporated herein by reference in its entirety. IBM is a registered trademark of International Business Machines Corporation, Armonk, N.Y., USA. Other names used herein may be registered trademarks, trademarks or product names of International Business Machines Corporation or other companies.

The native processor 27 typically executes emulation software stored in the emulation routines memory 23 comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor 27. These converted instructions may be cached such that a faster conversion can be accomplished. The emulation software maintains the architecture rules of the emulated processor architecture so as to assure operating systems and applications written for the emulated processor operate correctly. Furthermore the emulation software provides resources identified by the emulated processor architecture including, but not limited to control registers, general purpose registers, floating point registers, dynamic address translation function including segment tables and page tables for example, interrupt mechanisms, context switch mechanisms, time of day (TOD) clocks and architected interfaces to I/O subsystems such that an operating system or an application program designed to run on the emulated processor 29, can be run on the native processor 27 having the emulation software.

A specific instruction being emulated is decoded, and a subroutine called to perform the function of the individual instruction. An emulation software function emulating a function of an emulated processor 29 is implemented, for example, in a "C" subroutine or driver, or some other method of providing a driver for the specific hardware as will be within the skill of those in the art after understanding the description of the preferred embodiment.

In an embodiment, the invention may be practiced by software (sometimes referred to licensed internal code, firmware, micro-code, milli-code, pico-code and the like, any of which would be consistent with the present invention). Referring to FIG. 1A, software program code which embodies the present invention is accessed by the processor also known as a CPU (Central Processing Unit) 1 of the host computer system 50 from the storage device 11 such as a long-term storage media, a CD-ROM drive, tape drive or hard drive. The software program code may be embodied on any of a variety of known media for use with a data processing system, such as a diskette, hard drive, or CD-ROM. The code may be distributed on such media, or may be distributed to users from the computer memory 2 or storage of one computer system over a network 10 to other computer systems for use by users of such other systems.

Alternatively, the program code may be embodied in the computer memory 2, and accessed by the processor 1 using a processor bus (not shown). Such program code includes an operating system which controls the function and interaction of the various computer components and one or more application programs. Program code is normally paged from a dense media such as the storage device 11 to computer memory 2 where it is available for processing by the processor 1. The techniques and methods for embodying software program code in memory, on physical media, and/or distributing software code via networks are well known and will not be further discussed herein. Program code, when created and stored on a tangible medium (including but not limited to electronic memory modules (RAM), flash memory, compact discs (CDs), DVDs, Magnetic Tape and the like is often referred to as a "computer program product." The computer program product medium is typically readable by a processing circuit preferably in a computer system for execution by the processing circuit.

Figure 1C:
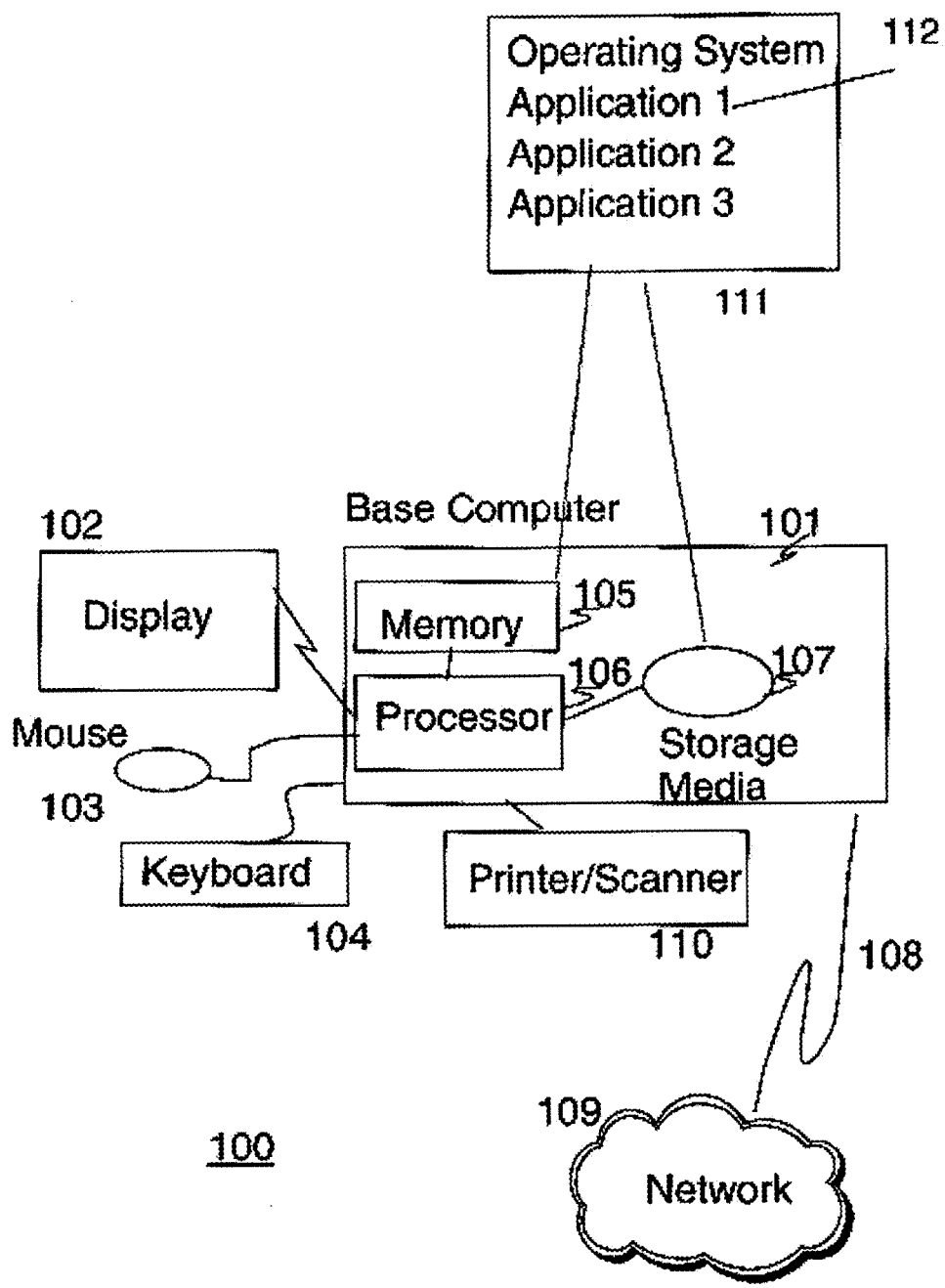
FIG. 1C is a diagram depicting an example computer system in an embodiment.

FIG. 1C illustrates a representative workstation or server hardware system in which the present invention may be practiced. The system 100 of FIG. 1C comprises a representative base computer system 101, such as a personal computer, a workstation or a server, including optional peripheral devices. The base computer system 101 includes one or more processors 106 and a bus (not shown) employed to connect and enable communication between the one or more processors 106 and the other components of the base computer system 101 in accordance with known techniques. The bus connects the processor 106 to memory 105 and long-term storage 107 which may include a hard drive (including any of magnetic media, CD, DVD and Flash Memory for example) or a tape drive for example. The base computer system 101 may also include a user interface adapter, which connects the one or more processors 106 via the bus to one or more interface devices, such as a keyboard 104, a mouse 103, a printer/scanner 110 and/or other interface devices, which may be any user interface device, such as a touch sensitive screen, digitized entry pad, etc. The bus also connects the one or more processors to a display device 102, such as an LCD screen or monitor via a display adapter.

The base computer system 101 may communicate with other computers or networks of computers by way of a network adapter capable of communicating 108 with a network 109. Example network adapters are communications channels, token ring, Ethernet or modems. Alternatively, the base computer system 101 may communicate using a wireless interface, such as a cellular digital packet data (CDPD) card. The base computer system 101 may be associated with such other computers in a local area network (LAN) or a wide area network (WAN), or the base computer system 101 may be a client in a client/server arrangement with another computer, etc.

Figure 2:
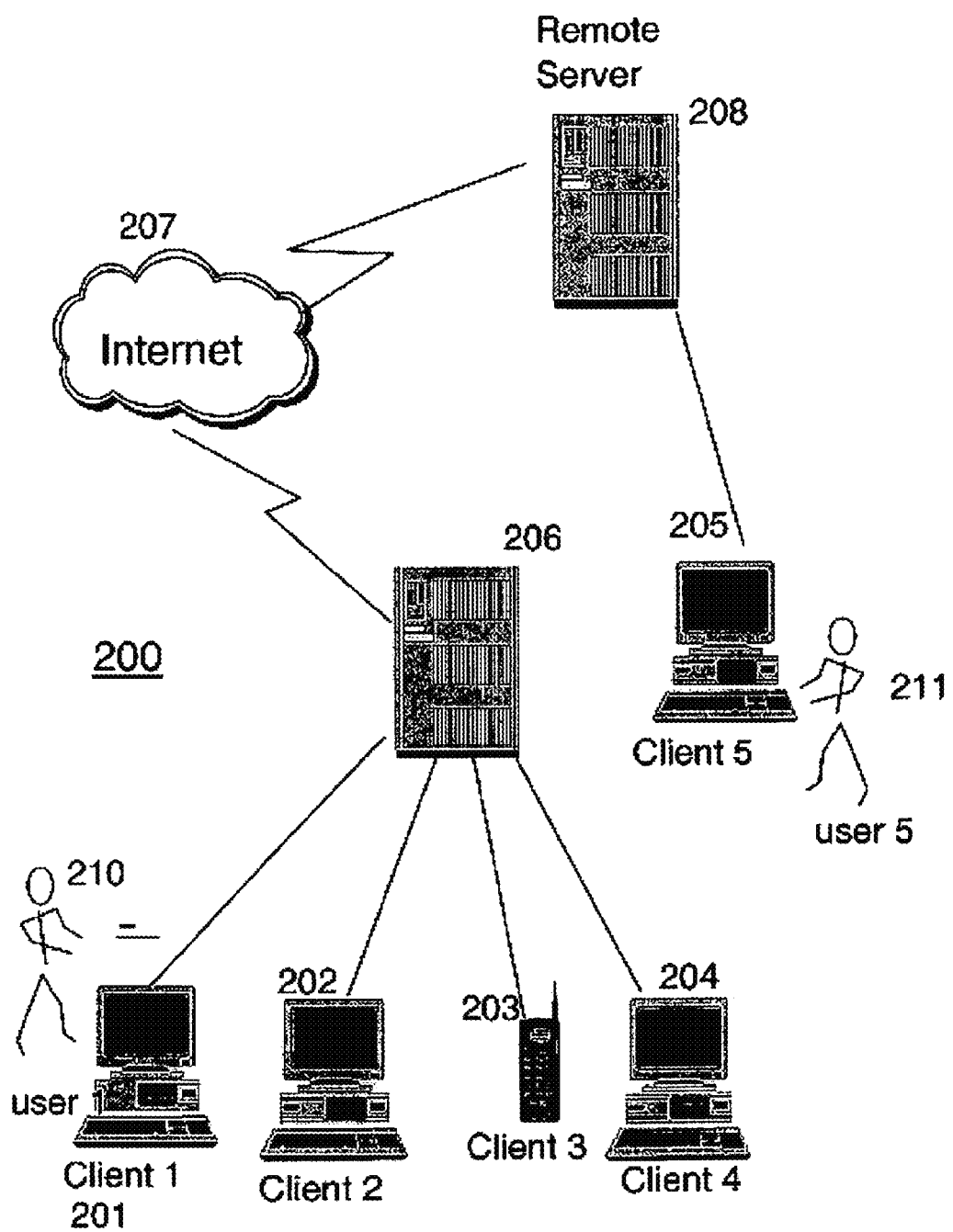
FIG. 2 is a diagram depicting an example computer network in an embodiment.

FIG. 2 illustrates a data processing network 200 in which the present invention may be practiced. The data processing network 200 may include a plurality of individual networks, such as a wireless network and a wired network, each of which may include a plurality of individual workstations 201, 202, 203, 204 and or the base computer system 101 of FIG. 1C. Additionally, as those skilled in the art will appreciate, one or more LANs may be included, where a LAN may comprise a plurality of intelligent workstations coupled to a host processor.

Programming code 111 may be embodied in the memory 105, and accessed by the processor 106 using the processor bus. Such programming code includes an operating system which controls the function and interaction of the various computer components and one or more application programs 112. Program code is normally paged from long-term storage 107 to high-speed memory 105 where it is available for processing by the processor 106. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Still referring to FIG. 2, the networks may also include mainframe computers or servers, such as a gateway computer (client server) 206 or application server (remote server) 208 which may access a data repository and may also be accessed directly from a workstation 205. A gateway computer 206 serves as a point of entry into each network 207. A gateway is needed when connecting one networking protocol to another. The gateway computer 206 may be preferably coupled to another network (the Internet 207 for example) by means of a communications link. The gateway computer 206 may also be directly coupled to the one or more workstations 101, 201, 202, 203, and 204 using a communications link. The gateway computer may be implemented utilizing an IBM eServer™ zSeries® z9® Server available from International Business Machines Corporation.

In an embodiment, software programming code which embodies the present invention is accessed by the processor 106 of the base computer system 101 from long-term storage media, such as the long-term storage 107 of FIG. 1C. The software programming code may be embodied on any of a variety of known media for use with a data processing system, such as a diskette, hard drive, or CD-ROM. The code may be distributed on such media, or may be distributed to users 210 and 211 from the memory or storage of one computer system over a network to other computer systems for use by users of such other systems.

Figure 3:
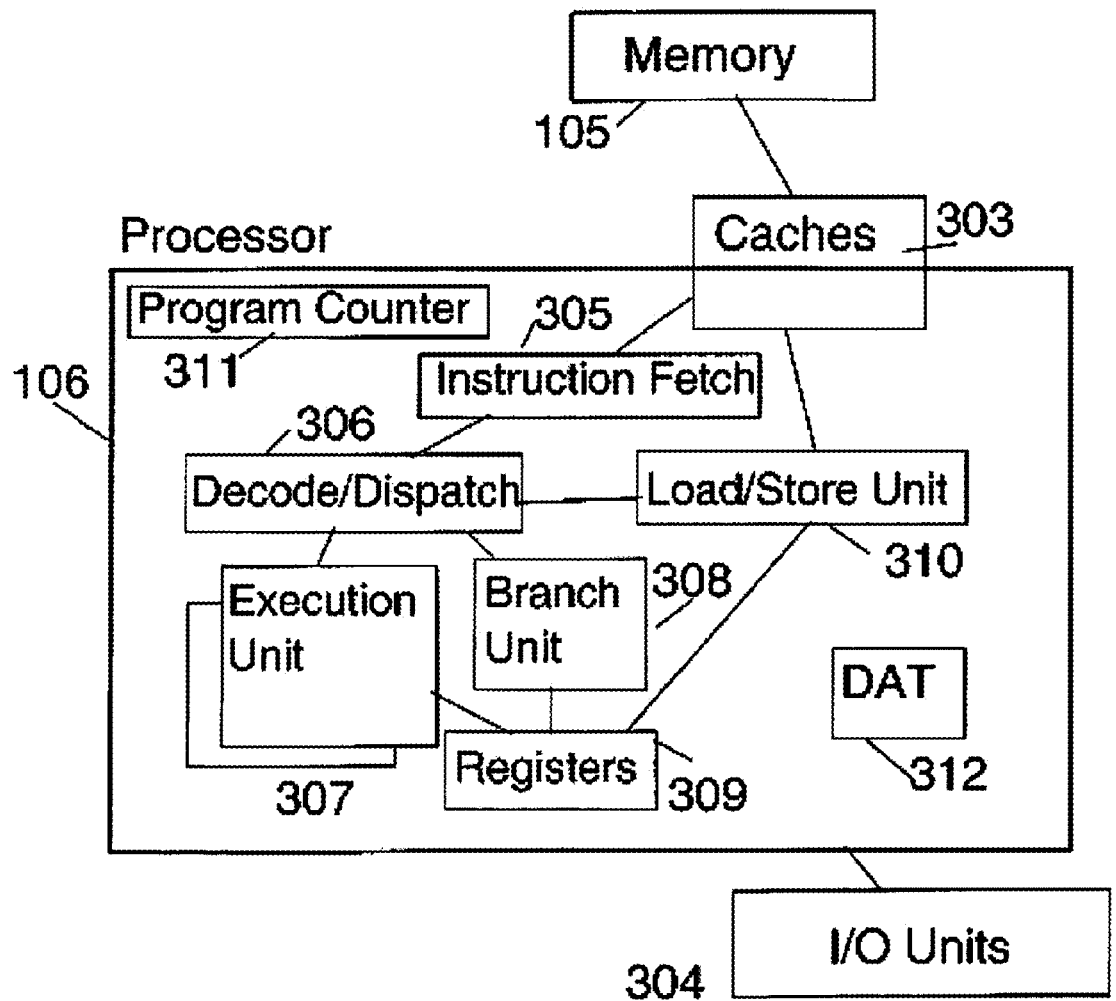
FIG. 3 is a diagram depicting an elements of a computer system in an embodiment.

Referring to FIG. 3, an exemplary processor embodiment is depicted for processor 106. One or more levels of cache 303 are employed to buffer memory blocks in order to improve the performance of the processor 106. The cache 303 is a high speed buffer holding cache lines of memory data that are likely to be used. Typical cache lines are 64, 128 or 256 bytes of memory data. In an embodiment, separate caches are employed for caching instructions than for caching data. Cache coherence (synchronization of copies of lines in memory and the caches) is often provided by various "snoop" algorithms well known in the art. Main storage, such as memory 105 of a processor system is often referred to as a cache. In a processor system having 4 levels of cache 303 memory 105 is sometimes referred to as the level 5 (L5) cache since it is typically faster and only holds a portion of the non-volatile storage (DASD, Tape etc) that is available to a computer system. Memory 105 "caches" pages of data paged in and out of the memory 105 by the operating system.

A program counter (instruction counter) 311 keeps track of the address of the current instruction to be executed. A program counter in a z/Architecture processor is 64 bits and may be truncated to 31 or 24 bits to support prior addressing limits. A program counter is typically embodied in a program status word (PSW) of a computer such that it persists during context switching. Thus, a program in progress, having a program counter value, may be interrupted by, for example, the operating system (i.e., the current context switches from the program environment to the operating system environment). The PSW of the program maintains the program counter value while the program is not active, and the program counter (in the PSW) of the operating system is used while the operating system is executing. In an embodiment, the program counter is incremented by an amount equal to the number of bytes of the current instruction. Reduced Instruction Set Computing (RISC) instructions are typically fixed length while Complex Instruction Set Computing (CISC) instructions are typically variable length. Instructions of the IBM z/Architecture are CISC instructions having a length of 2, 4 or 6 bytes. The program counter 311 is modified by either a context switch operation or a branch taken operation of a branch instruction for example. In a context switch operation, the current program counter value is saved in the PSW along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 311.

In an embodiment, an instruction fetch unit 305 is employed to fetch instructions on behalf of the processor 106. The instruction fetch unit 305 either fetches the "next sequential instructions," the target instructions of branch taken instructions, or the first instructions of a program following a context switch. In an embodiment, the instruction fetch unit 305 employs prefetch techniques to speculatively prefetch instructions based on the likelihood that the prefetched instructions might be used. For example, the instruction fetch unit 305 may fetch 16 bytes of instructions that include the next sequential instruction and additional bytes of further sequential instructions.

The fetched instructions are then executed by the processor 106. In an embodiment, the fetched instruction(s) are passed to a decode/dispatch unit 306 of the instruction fetch unit 305. The decode/dispatch unit 306 decodes the instruction(s) and forwards information about the decoded instruction(s) to appropriate execution units 307, 308, and/or 310. An execution unit 307 receives information about decoded arithmetic instructions from the instruction fetch unit 305 and will perform arithmetic operations on operands according to the operation code (opcode) of the instruction. Operands are provided to the execution unit 307 either from the memory 105, architected registers 309, or from an immediate field of the instruction being executed. Results of the execution, when stored, are stored either in memory 105, architected registers 309 or in other machine hardware (such as control registers, PSW registers and the like).

Figure 4A:
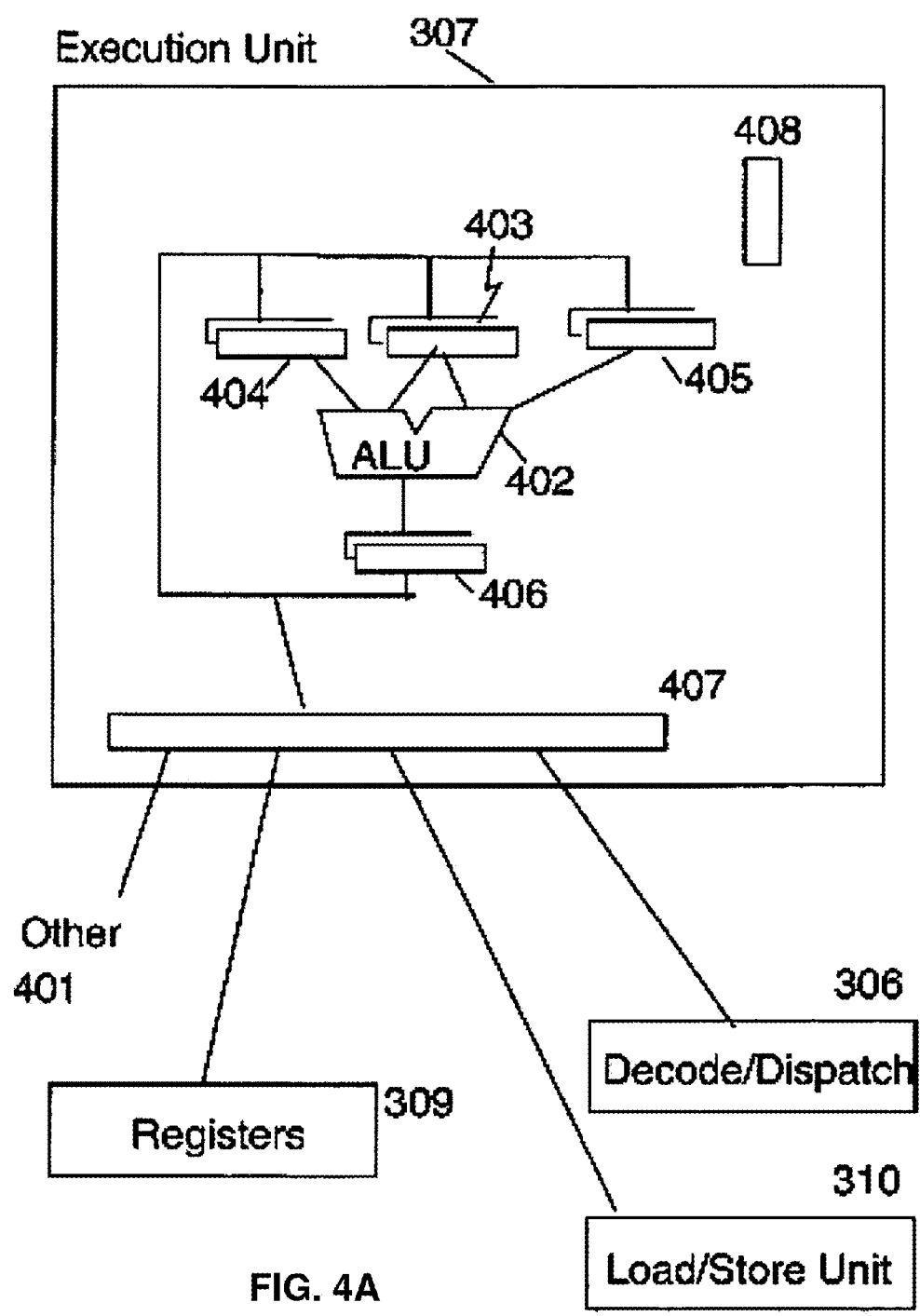
FIGS. 4A-4C depict detailed elements of a computer system in an embodiment.

A processor 106 typically has one or more execution units 307, 308, and 310 for executing the function of the instruction. Referring to FIG. 4A, an execution unit 307 may communicate with the architected registers 309, the decode/dispatch unit 306, the load/store unit 310 and other processor units 401 by way of interfacing logic 407. The execution unit 307 may employ several register circuits 403, 404, and 405 to hold information that the arithmetic logic unit (ALU) 402 will operate on. The ALU 402 performs arithmetic operations such as add, subtract, multiply and divide as well as logical function such as and, or and exclusive-or (xor), rotate and shift. In an embodiment, the ALU 402 supports specialized operations that are design dependent. Other circuits may provide other architected facilities 408 including condition codes and recovery support logic for example. Typically the result of an ALU operation is held in an output register circuit 406 which can forward the result to a variety of other processing functions. In other embodiments, there are many arrangements of processor units, the present description is only intended to provide a representative understanding of one embodiment.

An ADD instruction for example would be executed in an execution unit 307 having arithmetic and logical functionality while a floating point instruction for example would be executed in a floating point execution unit (not shown) having specialized floating point capability. Preferably, an execution unit operates on operands identified by an instruction by performing an opcode defined function on the operands. For example, an ADD instruction may be executed by an execution unit 307 on operands found in two architected registers 309 identified by register fields of the instruction.

The execution unit 307 performs the arithmetic addition on two operands and stores the result in a third operand where the third operand may be a third register or one of the two source registers. The execution unit 307 preferably utilizes an arithmetic logic unit (ALU) 402 that is capable of performing a variety of logical functions such as shift, rotate, and, or and XOR as well as a variety of algebraic functions including any of add, subtract, multiply, divide. Some ALUs 402 are designed for scalar operations and some for floating point. In embodiments, data may be big endian (where the least significant byte is at the highest byte address) or little endian (where the least significant byte is at the lowest byte address) depending on architecture. The IBM z/Architecture is big endian. Signed fields may be sign and magnitude, 1's complement or 2's complement depending on architecture. A 2's complement number is advantageous in that the ALU 402 does not need to design a subtract capability since either a negative value or a positive value in 2's complement requires only and addition within the ALU. Numbers are commonly described in shorthand, where a 12 bit field defines an address of a 4,096 byte block and is commonly described as a 4 Kbyte (Kilo-byte) block for example.

Figure 4B:
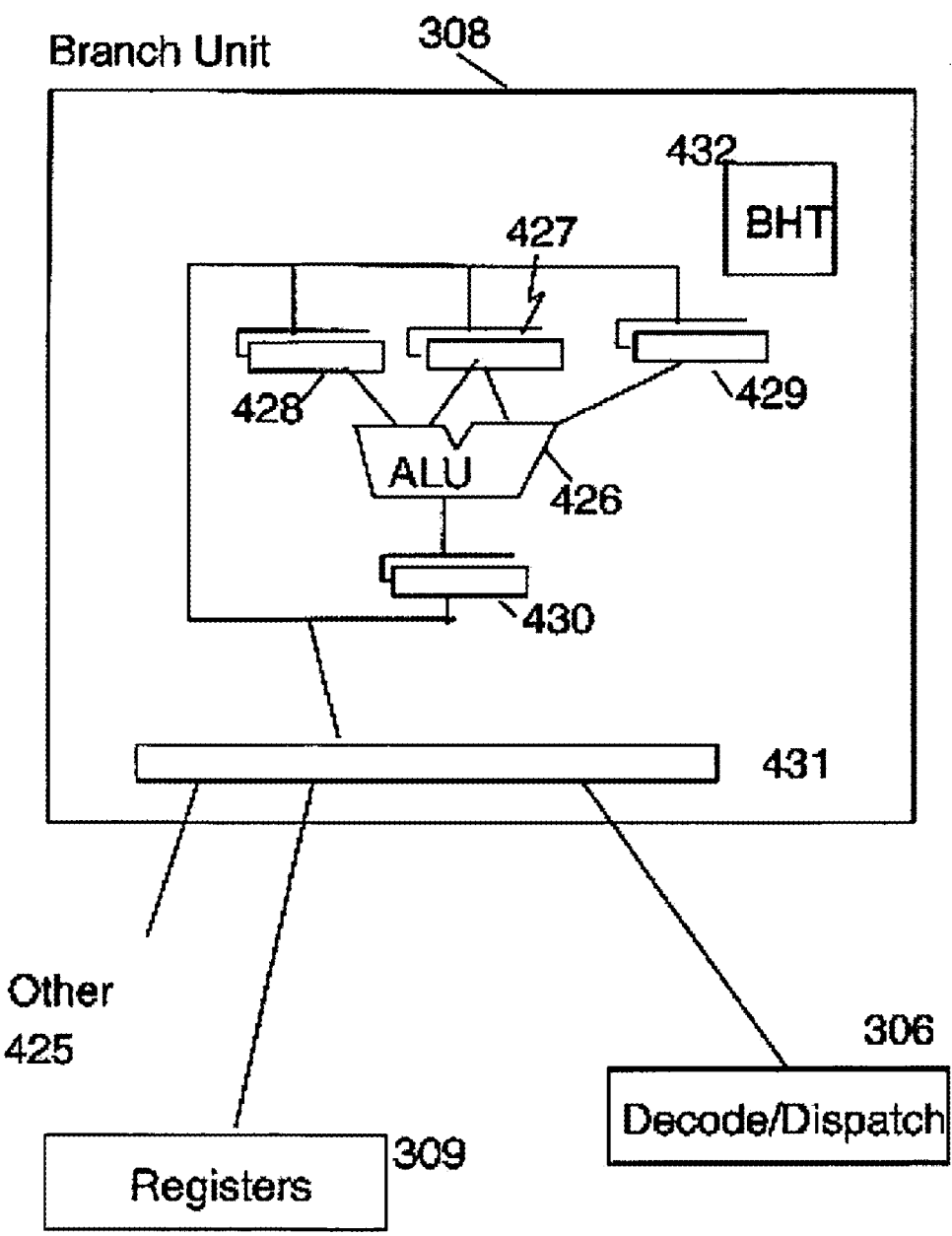

Referring to FIG. 4B, Branch instruction information for executing a branch instruction is typically sent to a branch unit 308 which employs a branch prediction algorithm such as a branch history table 432 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. In an embodiment, the branch unit 308 may employ an ALU 426 having a plurality of input register circuits 427, 428, and 429 and an output register circuit 430. The branch unit 308 may communicate with general registers, decode/dispatch unit 306 or other circuits 425 for example.

The execution of a group of instructions may be interrupted for a variety of reasons including a context switch initiated by an operating system, a program exception or error causing a context switch, an I/O interruption signal causing a context switch or multi-threading activity of a plurality of programs (in a multi-threaded environment) for example. In an embodiment, a context switch action saves state information about a currently executing program and then loads state information about another program being invoked. State information may be saved in hardware registers or in memory for example. State information includes a program counter value pointing to a next instruction to be executed, condition codes, memory translation information and architected register content. A context switch activity may be exercised by hardware circuits, application programs, operating system programs or firmware code (microcode, pico-code or licensed internal code (LIC) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture long displacement facility wherein the instruction defines a base register, an index register and an immediate field (displacement field) that are added together to provide the address of the operand in memory. Location herein implies a location in main memory (main storage) unless otherwise indicated.

Figure 4C:
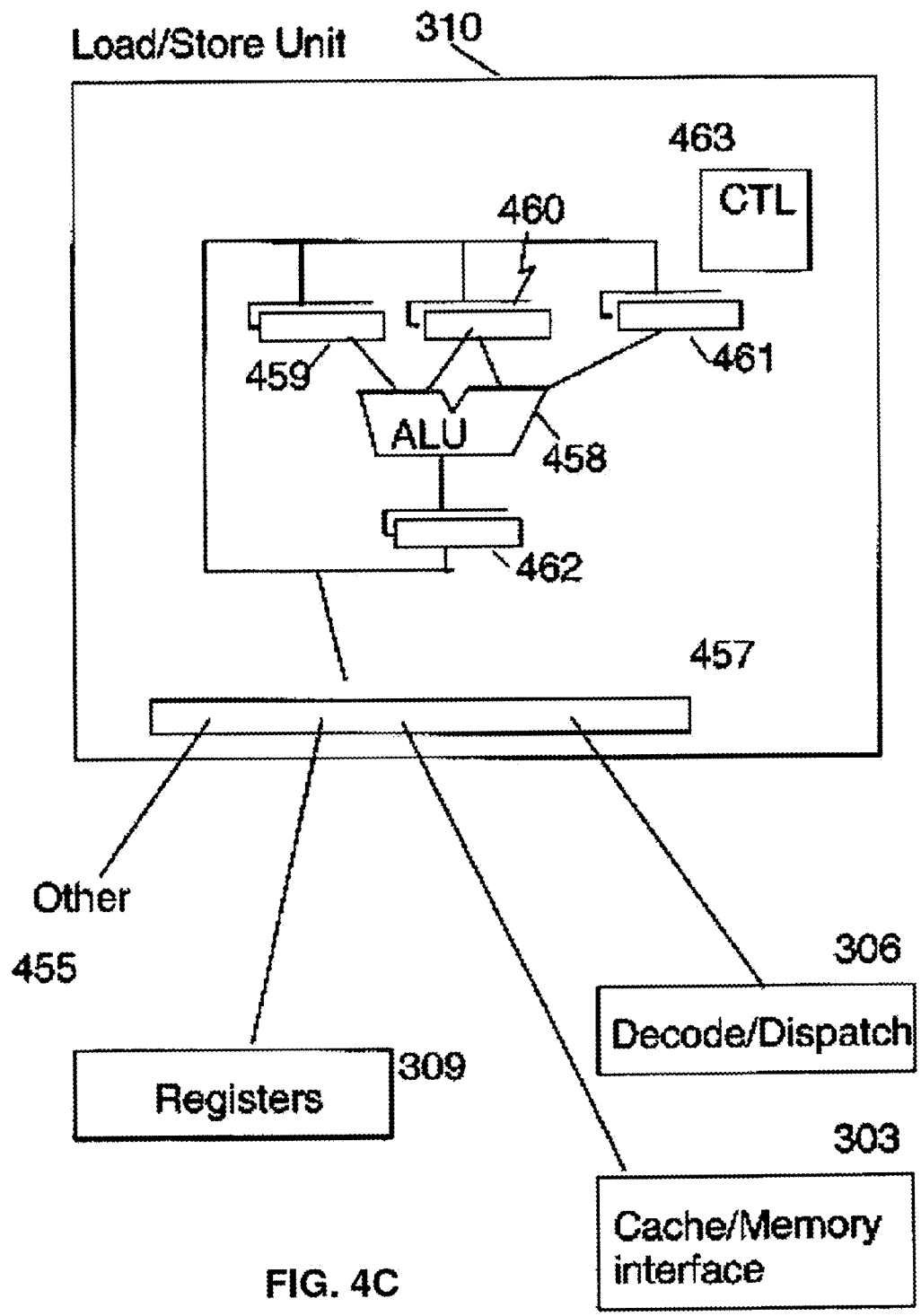

Referring to FIG. 4C, a processor accesses storage using a load/store unit 310. The load/store unit 310 may perform a load operation by obtaining the address of the target operand in memory through the cache/memory interface and loading the operand in an architected register 309 or another memory location, or may perform a store operation by obtaining the address of the target operand in memory and storing data obtained from an architected register 309 or another memory location in the target operand location in memory. The load/store unit 310 may be speculative and may access memory in a sequence that is out-of-order relative to the instruction sequence; however the load/store unit 310 maintains the appearance to programs that instructions were executed in order. A load/store unit 310 may communicate with architected registers 309, decode/dispatch unit 306, cache/memory interface or other elements 455 and comprises various register circuits, ALUs 458 and control logic 463 to calculate storage addresses and to provide pipeline sequencing to keep operations in-order. Some operations may be out of order but the load/store unit provides functionality to make the out of order operations appear to the program as having been performed in order as is well known in the art.

Preferably addresses that an application program "sees" are often referred to as virtual addresses. Virtual addresses are sometimes referred to as "logical addresses" and "effective addresses." These virtual addresses are virtual in that they are redirected to physical memory location by one of a variety of DAT technologies such as the DAT 312 of FIG. 3, including, but not limited to prefixing a virtual address with an offset value, translating the virtual address via one or more translation tables, the translation tables including at least a segment table and a page table alone or in combination, preferably, the segment table having an entry pointing to the page table. In z/Architecture, a hierarchy of translations is provided including a region first table, a region second table, a region third table, a segment table and an optional page table. The performance of the address translation is often improved by utilizing a translation look-aside buffer (TLB) which comprises entries mapping a virtual address to an associated physical memory location. The entries are created when DAT 312 translates a virtual address using the translation tables. Subsequent use of the virtual address can then utilize the entry of the fast TLB rather than the slow sequential translation table accesses. The TLB content may be managed by a variety of replacement algorithms including least recently used (LRU).

In the case where the processor 106 is a processor of a multi-processor system, each processor has responsibility to keep shared resources such as I/O, caches, TLBs and Memory interlocked for coherency. In an embodiment, "snoop" technologies will be utilized in maintaining cache coherency. In a snoop environment, each cache line may be marked as being in any one of a shared state, an exclusive state, a changed state, an invalid state and the like in order to facilitate sharing.

The I/O units 304 of FIG. 3 provide the processor 106 with means for attaching to peripheral devices including tape, disc, printers, displays, and networks for example. The I/O units 304 are often presented to the computer program by software drivers. In mainframes such as the z/Series from IBM, channel adapters and open system adapters are I/O units of the mainframe that provide the communications between the operating system and peripheral devices.

Instrumentation data is data related to the operations of the processor 106. In an embodiment, access to instrumentation data and other system level metrics may be restricted, or unavailable. A computer processor operates under a privileged state (or supervisor state), and a lesser-privileged state (or problem state). In the privileged state, a program may have access to all system resources via privileged operations (e.g., access to all control registers and the supervisor memory space). The privileged state is also referred to as privileged mode or supervisor mode. An operating system executing on the computer processor may be operating in the privileged state. The lesser-privileged state is a non-privileged state where access to system resources is limited. For example, application programs running in lesser-privileged state may have limited or no access to control registers and may access only user memory space assigned to the application program by the operating system. The lesser-privileged state is typically assigned to application programs executed under control of an operating system, and no privileged operations can be performed in the lesser-privileged state. The lesser-privileged state is also known as a problem state, problem mode or user mode.

One such restricted resource that is not write-accessible to a program executing in the lesser-privileged state is the program status word (PSW). The PSW may comprise a program counter of the next instruction to be executed, a condition code field usable by branch instructions, an instrumentation control field for indicating whether instrumentation is enabled or disabled, and other information used to control instruction sequencing and to determine the state of the computer processor including the privilege state assigned to the program. In a multithreaded processing environment, multiple programs share, or time slice, the available computer processor capacity. Each of the programs has context information including an associated PSW, an origin address of an address translation table for accessing main storage assigned to the program, a set of general purpose register current values, control registers, floating point registers, etc. The currently active, or controlling PSW, is called the current PSW. It governs the program currently being executed. The computer processor has an interruption capability, which permits the computer processor to context switch rapidly to another program in response to exception conditions and external stimuli. When an interruption occurs, the computer processor places the current PSW in an assigned storage location, called the old-PSW location, for the particular class of interruption. The computer processor fetches a new PSW from a second assigned storage location. This new context determines the next program to be executed. In an embodiment, these storage locations are located in a memory location accessible to the computer processor. When the computer processor has finished processing the interruption, the program handling the interruption may reload the old context including the old PSW, making it again the current PSW, so that the interrupted program can continue.

The fields of the PSW may be referenced either explicitly (e.g., when instruction execution reads part of the PSW bits), or implicitly (e.g., in instructions fetching, operand fetching, address generation calculations, address generation sources, etc.). The explicit reference is generally performed at execution time, whereas the implicit reference is generally performed at different stages of the pipeline during instruction execution (i.e., instruction fetch, instruction decode, execution time and completion time). Individual fields in the PSW may be referenced or updated independently of each other.

In an embodiment, by manipulating the context, an operating system controls computer processing resources, including enabling run-time-instrumentation by the computer processor. The run-time-instrumentation may be enabled or disabled during the execution of the operating system, as well as by any software applications executed by the operating system. The enabled/disabled state of run-time-instrumentation is saved as context information in the PSW associated with a program.

A run-time-instrumentation (RI) facility may be incorporated on models implementing z/Architecture. When the RI facility is installed and enabled, data is collected during program execution into one or more collection buffers within the CPU and then reported to a program buffer. Each unit of information stored is called a reporting group. The contents of a reporting group consist of multiple records whose contents represent events recognized by the CPU during program execution.

When the run-time-instrumentation facility is installed in a configuration, a PSW field (RI bit) enables run-time-instrumentation. Validity of the run-time-instrumentation controls determines the capability of turning on the RI bit, but when RI is one, the CPU controls are valid and run-time-instrumentation is enabled. The run-time-instrumentation facility may include the following instructions: load run-time-instrumentation controls, modify run-time-instrumentation controls, run-time-instrumentation emit, run-time-instrumentation next, run-time-instrumentation off, run-time-instrumentation on, store run-time-instrumentation controls, and test run-time-instrumentation controls.

The load run-time-instrumentation controls (LRIC) instruction initializes the run-time-instrumentation controls that govern run-time-instrumentation. The modify run-time-instrumentation controls (MRIC) instruction modifies all or a subset of the run-time-instrumentation controls originally established by LRIC. The run-time-instrumentation emit (RIEMIT) instruction collects the value of a general register by storing it into a collection buffer. The run-time-instrumentation next (RINEXT) instruction performs directed sampling of the next, sequential instruction (NSI) after RINEXT. The run-time-instrumentation off (RIOFF) instruction disables run-time-instrumentation. The run-time-instrumentation on (RION) instruction enables run-time-instrumentation. The store run-time-instrumentation controls (STRIC) instruction places the current values of the run-time-instrumentation controls into a specified storage location. The test run-time-instrumentation controls (TRIC) instruction examines the run-time-instrumentation controls. If valid, the state of a controls-altered indicator is set.

The run-time-instrumentation facility includes the ability for making a measurement-alert external interruption pending. Some of the information collected by run-time-instrumentation and reported to a program buffer is model-dependent and thus not defined. Samples and data provided by the run-time-instrumentation facility are intended for statistical estimation of performance characteristics, are substantially accurate, and may not be repeatable. For example, regardless of sampling mode, it is unpredictable if a sample instruction that caused an exception or is associated with certain system internal activities would result in the store of a reporting group and, if stored, whether the model-dependent data included in run-time-instrumentation data is affected.

A collection buffer is used to capture a set of records whose contents report on events recognized by the processor during program execution. Examples are: execution of one or more taken branches, transactional-execution abort events, and an operand of the RIEMIT instruction. Execution of the RIEMIT instruction collects the value of a general register by storing it into the collection buffer. Additional data can be collected and/or stored in other buffers, such as an instruction-data buffer.

Reporting is subject to reporting controls. When a sample instruction is identified, each reporting control enables the checking of a corresponding condition. If a corresponding condition exists, a reporting group is formed and stored. A reporting group is not stored when no reporting control is enabled or the corresponding condition does not exist for an enabled reporting control. Data reported about a sample instruction is acquired from the instruction-data buffer and other model-dependent sources, and then used to create the contents of one or more records of the reporting group, one such record being an instruction record.

Record types that may be captured in the reporting group store include: filler, extra, begin, timestamp, instruction, emit, TX abort, call, return, and transfer. A filler record is used in a reporting group when the number of valid records in the collection buffer is not sufficient to fill a reporting group of the current reporting-group size. An extra record may be used in the extra section of a reporting group. A begin record is the first record of the first reporting group. A timestamp record is stored as record 0 of every reporting group other than the first reporting group. An instruction record is created when a reporting group is stored for a sample instruction as the last record of the reporting group. An emit record is created by successful execution of RIEMIT. A transaction-execution (TX) mode abort record is created by either an implicit abort or by execution of a transaction abort instruction. A call record is created by execution of a branch instruction which is categorized as a call-type branch instruction. A return record is created by execution of a return-type branch instruction which is categorized as a return instruction. A transfer record is created by execution of a branch instruction which meets certain condition code criteria.

Figure 5:
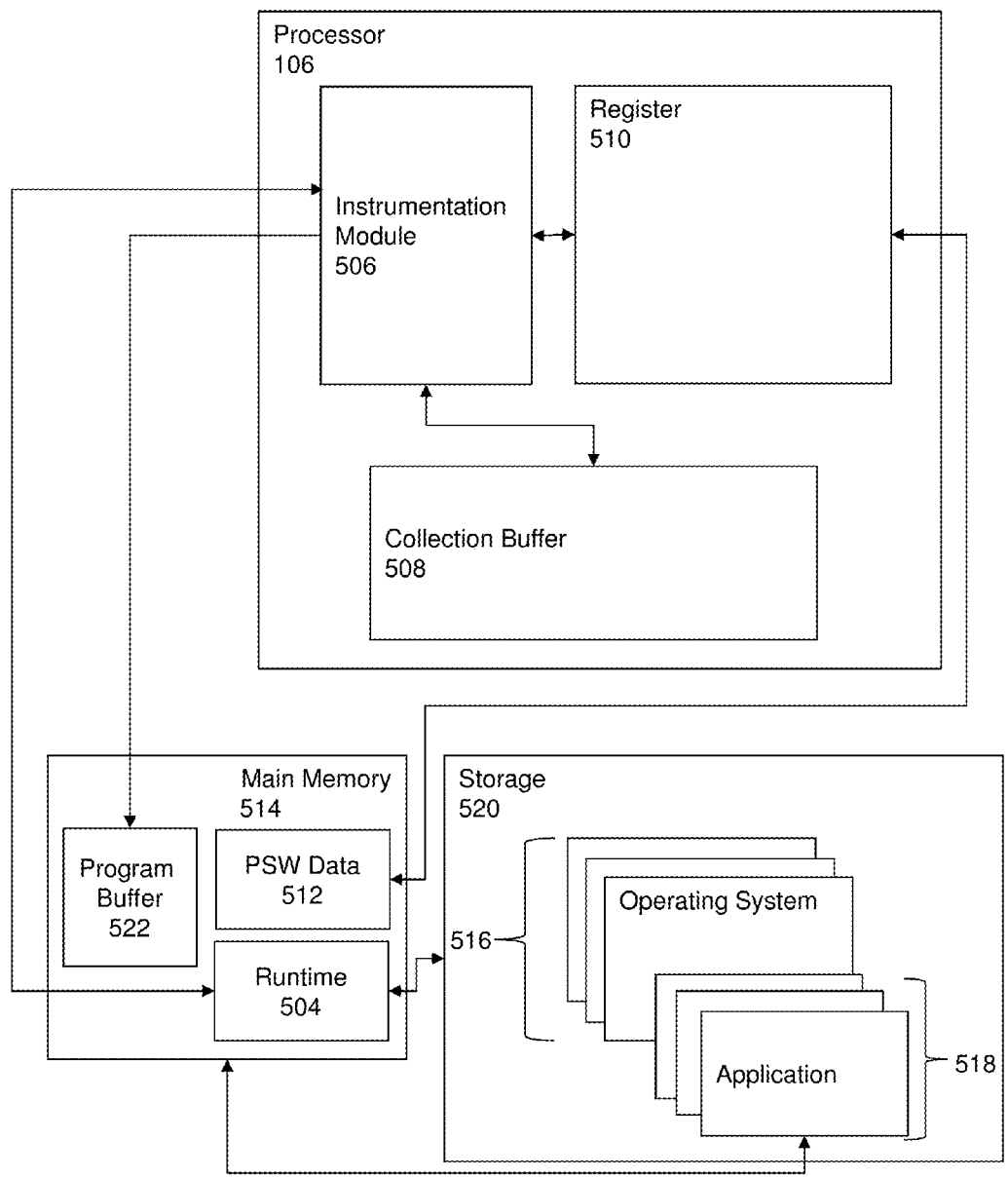
FIG. 5 depicts a schematic diagram of a system for run-time-instrumentation of a processor in accordance with an embodiment.

FIG. 5 depicts a schematic diagram of a system for run-time-instrumentation of a processor that may be implemented in an embodiment. In an embodiment, the system 500 includes a central processing unit (CPU) such as the processor 106 of FIG. 1. In an embodiment, the processor 106 is a single processor. In an alternate embodiment, the processor 106 is a single processing core of a multi-core processor. In an embodiment, the processor 106 is capable of operating at varying speeds.

In an embodiment, the processor 106 further includes a register 510. The register 510 is a hardware register capable of storing words of data for use by the processor 106. The register 510 includes one or more latches for storing bits of data that are accessible by the processor 106. The register 510, may include general purpose registers and control registers for example. The processor 106 additionally includes an instrumentation module 506 that is in communication with the register 510. The instrumentation module 506 controls the instrumentation of the processor 106. The instrumentation module 506 is configured to collect instrumentation data, such as the execution path of one or more taken branches, transactional execution abort events, various runtime operands, timestamp information, etc. directly from the processor 106. The instrumentation module 506 collects the instrumentation data from the processor 106, and stores the instrumentation data in a collection buffer 508. In an embodiment, the collection buffer 508 is a circular buffer that collects data received from the instrumentation module 506, and when the circular buffer is filled it overwrites the oldest data with new data.

The processor 106 executes one or more operating systems 516 and one or more applications 518. The one or more operating systems 516 and one or more applications 518 are stored in a storage 520, such as a hard drive, CD/ROM, flash memory, etc. and are loaded into a main memory 514 in a runtime memory 504 area reserved for storing one or more active pieces of the currently executing operating system and/or application, called pages, which are loaded from the storage 520 into runtime memory 504 as needed. In an embodiment, each of the operating systems execute as a virtual machine managed by a hypervisor (not shown) and executed by the processor 106.

In an embodiment the processor 106 loads a PSW in the register 510 from PSW data 512 in main memory 514 for the currently executing operating system or application from the main memory 514 and sets one or more processor settings in, for example, the register 510. In an embodiment, the PSW in the register 510 includes one or more bits for enabling and controlling the instrumentation module 506.

The one or more applications 518 include software applications compiled to execute on a specific operating system, interpreted code executing on an interpreter (e.g., Java™), or operating system support threads (e.g., process management, daemons, etc.). Each of the one or more operating systems 516 and or the one or more applications 518 may execute an instruction to trigger the instrumentation module 506 to start, or to stop, the collecting instrumentation data.

In an embodiment, one of the one or more applications 518 executes an instruction that has been determined to be a sample instruction, thereby creating a sample point at the completion of execution of the sample instruction and that then causes the instrumentation module 506 to move the application's collected data from the collection buffer 508, to a program buffer 522 in main memory 514 that is accessible to the application. The main memory 514 may be any addressable memory known in the art. In an embodiment, the main memory 514 may include a fast-access buffer storage, sometimes called a cache. Each CPU may have an associated cache. In an additional embodiment, the main memory 514 is dynamic random access memory (DRAM). In a yet another embodiment, the main memory is a storage device, such as a computer hard drive, or flash memory accessible by an application.

A run-time-instrumentation function is a new facility that may be used in not only in a laboratory environment, or for off-line analysis, but also in live software environments within programs at runtime, and under program control. A privileged state may set controls of a processor 106 to manage run-time-instrumentation. The flexibility of the run-time-instrumentation facility is enhanced by providing the ability to change most of the controls from a lesser-privileged state. The lesser-privileged state is most likely to receive a benefit from run-time-instrumentation. A lesser-privileged state is prohibited from changing certain settings in order to ensure that (1) the privileged state maintains integrity and control over all the lesser-privileged state programs that it runs, and (2) a lesser-privileged state may or may not perform run-time-instrumentation when the operating system itself is performing run-time-instrumentation. Both may perform run-time-instrumentation if the supervisor momentarily disables run-time-instrumentation, saves its run-time-instrumentation context, restores the less-privileged state program's run-time-instrumentation context, and then starts the less-privileged state program with run-time-instrumentation re-enabled. If the context change does not include the appropriate saving/restoring of the run-time-instrumentation controls, a collision of data collected in both the privileged and lesser-privileged states would likely be an unusable collection of run-time-instrumentation data.

In an embodiment, in order to better support the lesser-privileged state program, a modify run-time-instruction (MRIC) instruction is defined. The MRIC instruction is a semi-privileged instruction that is used to modify certain processor 106 controls related to run-time-instrumentation, those controls which are currently active in the register 510. The controls are originally loaded by successful execution of the load run-time-instruction control (LRIC) instruction by the privileged state.

The MRIC instruction's ability to interact with the run-time-instrumentation controls is described in the details below. If the execution of the MRIC instruction is successful, then all controls that are specified by the MRIC instruction are set when execution of MRIC successfully completes, otherwise, if the execution of the MRIC instruction is unsuccessful, then no controls are affected.

Figure 6:
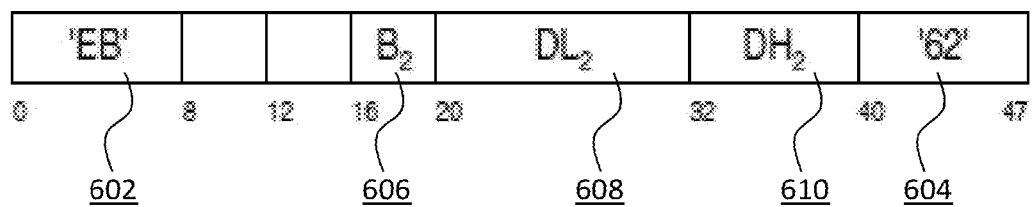
FIG. 6 depicts a modify run-time-instrumentation controls (MRIC) instruction in an embodiment.

FIG. 6 depicts an MRIC instruction in an embodiment. In an embodiment, the MRIC instruction 600 includes an operation code 602 and 604 (also referred to as "opcode" or "split opcode" in this particular case). The opcode 602 and 604 identifies the MRIC instruction 600 to the processor, such as the processor 106 of FIG. 5. The MRIC instruction 600 also includes an operand address which is determined from a base register field 606 ($B_2$), and a set of displacement fields 608 and 610, taken together. The sum of the contents of the base register plus the displacement indicates the location of a run-time-instrumentation controls control block (RICCB) that includes the run-time-instrumentation control settings that will be updated by the MRIC instruction. The displacement fields 608 and 610 indicate a displacement from the address contained in the base register indicated by the base register field 606 whose summation lines up with the RICCB. FIG. 6 depicts an embodiment of the MRIC instruction for purposes of clarity. It will be understood by those of ordinary skill in the art that the MRIC instruction may be formatted differently and/or contain different operands and opcodes in other embodiments.

The MRIC instruction 600 is used to update only a subset of controls that are updateable by an LRIC instruction. The controls set by an MRIC instruction 600 are limited to a subset of controls that have been successfully set by an LRIC instruction. The run-time-instrumentation controls include a number of bits that control the operation of the MRIC instruction, including the ability to update various run-time-instrumentation controls. In an embodiment, these bits are located in the subset of all run-time-instrumentation controls that may only be set by an LRIC instruction.

Figure 7:
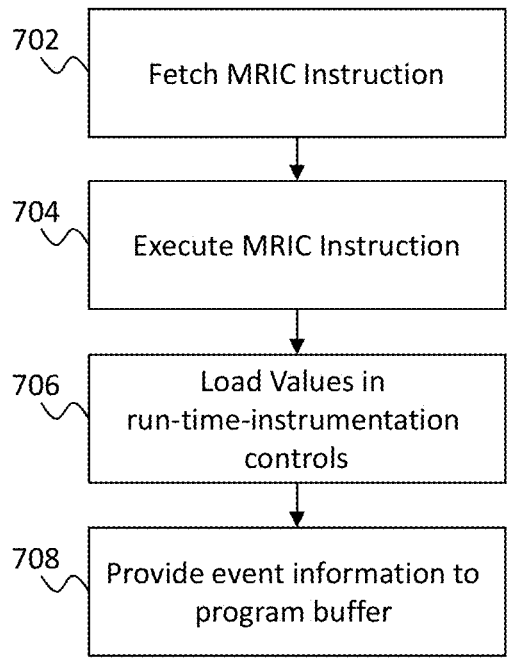
FIG. 7 depicts a process flow for initiating an MRIC instruction from a lesser-privileged state program in an embodiment.

FIG. 7 depicts a process flow for initiating an MRIC instruction from a lesser-privileged state program in an embodiment. At block 702, an MRIC instruction is fetched by the processor. At block 704, the MRIC instruction is executed by the processor. At block 706, the run-time-instrumentation control values in the RICCB are loaded in the run-time-instrumentation controls. At block 708, the run-time-instrumentation controls provide information to the program buffer 522 of FIG. 5 based on the loaded settings.

Figure 8:
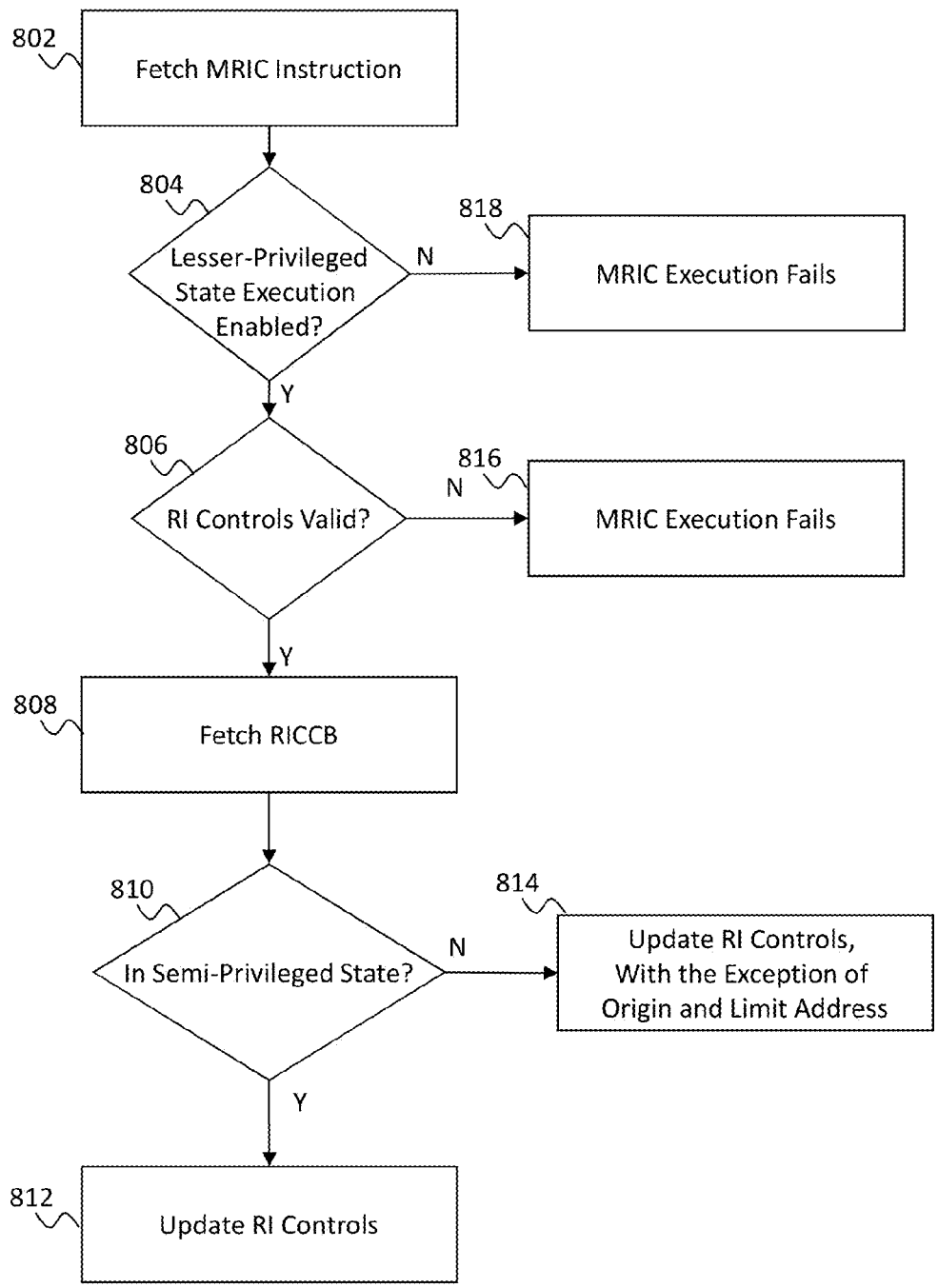
FIG. 8 depicts a process flow for initiating an MRIC instruction from a lesser-privileged state program in an additional embodiment.

FIG. 8 depicts a process flow for initiating an MRIC instruction from a lesser-privileged state program in an additional embodiment. In an embodiment, the process flow of FIG. 8 is executed by the instrumentation module 506 of FIG. 5. At block 802, an MRIC instruction issued by a lesser-privileged state program is fetched. The MRIC instruction includes an opcode and an operand. The operand of the MRIC instruction is the RICCB that includes run-time-instrumentation control values that will be used to update the run-time-instrumentation controls. These values include, for example, a control value to manage details of run-time-instrumentation data sampling; a control value to manage details of run-time-instrumentation data collection; a control value to manage details of run-time-instrumentation data reporting into the program buffer; a current address within a location of a program buffer, etc.

At block 804 it is determined if execution of MRIC is permitted. The run-time-instrumentation S bit (controlled only by LRIC) determines if the lesser-privileged state program is allowed to execute the MRIC instruction. If the run-time-instrumentation S bit is set to 1, then processing continues at block 806.

At block 806, it is determined if the validity bit (also referred to as the V bit) of the current run-time-instrumentation controls is set to 1. The validity bit indicates the validity of the set of run-time-instrumentation controls in the processor, as they were previously set by an LRIC instruction. If the current run-time-instrumentation controls are not valid, (i.e. the previous LRIC instruction was invalid), then at block 818 successful execution of MRIC instruction cannot occur. In an embodiment, unsuccessful execution of MRIC instruction does not change the prior settings and the runtime controls remain at their prior values. The validity bit cannot be updated by the MRIC instruction. At block 808, the RICCB that the MRIC instruction points to is fetched.

If the validity bit is set to 1 (i.e. the run-time-instrumentation controls are valid), then processing continues at block 810. At block 810, if the K bit is zero (i.e., the lesser-privileged state program is not executing in a semi-privileged state with regard to the run-time-instrumentation controls), then, at block 814, neither the origin address nor the limit address is updated, but all other controls permitted to be updated by MRIC are updated. If the K bit is one (i.e., the lesser-privileged state program is executing in a semi-privileged state with regard to the run-time-instrumentation controls), then, at block 812, all controls permitted to be updated by MRIC are updated, including the origin address and limit address.

Figure 9:
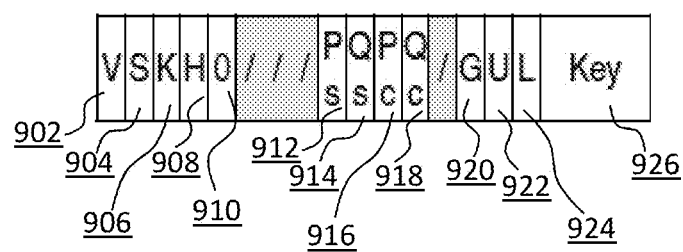
FIG. 9 depicts a portion of a run-time-instrumentation controls control block (RICCB) including controls that are settable by a privileged state in an embodiment.

FIG. 9 depicts a portion of a run-time-instrumentation controls control block (RICCB) including controls that are settable by a privileged state in an embodiment. The control block portion 900 may include additional values other than those described in reference to FIG. 9. Modification to the control block portion 900 may be performed by an LRIC instruction.

The control block portion includes a validity bit 902 (V bit). The validity bit 902 indicates the validity of the set of run-time-instrumentation controls in the processor, as they were previously set by an LRIC instruction.

The control block also includes an S bit 904, which is used to determine if the lesser-privileged state program is allowed to execute the MRIC instruction. The K bit 906 indicates if the lesser-privileged state program is permitted to execute in a semi-privileged state with regard to the run-time-instrumentation controls, such as the origin address, and the limit address of the run-time-instrumentation controls. The H bit 908 determines whether the address controls (i.e., the origin address, limit address, and current address) refer to a primary virtual address space or a home virtual address space. The 0 bit 910 is ignored and treated as a 0.

A lesser-privileged state sample reporting control bit 912 (Ps bit) is used in conjunction with lesser-privileged state programs. When in the lesser-privileged state and the Ps bit 912 in the run-time-instrumentation controls is zero, the reporting controls of the run-time-instrumentation controls are ignored when run-time-instrumentation is enabled, and thus do not cause a reporting group to be stored. When in the lesser-privileged state and the Ps bit 912 in the run-time-instrumentation controls is one, the reporting controls are checked and used according to their defined function.

A supervisor-state sample reporting control bit 914 (Qs bit) is used in conjunction with supervisor-state programs. When in the supervisor state and the Qs bit 914 in the run-time-instrumentation controls is zero, the reporting controls of the run-time-instrumentation controls are ignored when run-time-instrumentation is enabled, and thus do not cause a reporting group to be stored. When in the supervisor state and the Qs bit 914 in the run-time-instrumentation controls is one, the reporting controls are checked and used according to their defined function.

The lesser-privileged state collection buffer control bit 916 (Pc bit) controls updates to the collection buffer 508 of FIG. 5. When in lesser-privileged state and the Pc bit 916 in the run-time-instrumentation controls is zero, collection buffer controls of the run-time-instrumentation controls are ignored when run-time-instrumentation is enabled and updates of the collection buffer 508 are prevented. When in the lesser-privileged state and the Pc bit 916 in the run-time-instrumentation controls is one, the collection buffer controls are checked and used according to their defined function.

The supervisor-state collection buffer control bit 918 (Qc bit) controls updates to the collection buffer 508. When in supervisor state and the Qc bit 918 in the run-time-instrumentation controls is zero, collection buffer controls of the run-time-instrumentation controls are ignored when run-time-instrumentation is enabled and the updates to the collection buffer 508 are prevented. When in supervisor state and the Qc bit 918 in the run-time-instrumentation controls is one, the indicated collection-buffer controls are checked and used according to their defined function.

The G bit 920 is the pending control of a run-time-instrumentation-halted interruption, also called a halted interruption. When the G bit 920 is zero, a halted interruption is not pending. When the G bit 902 is one, a halted interruption is pending. When the first reporting group in a program buffer 522 is written, the G bit 920 is set to zero. That is, when an origin address of the program buffer equals a limit address of the program buffer the G bit 920 is set to zero. When an attempt to store other than the first reporting group in program buffer 522 is made, the G bit 920 is set to zero if the run-time-instrumentation-halted condition does not exist, and the reporting group is stored. When an attempt to store other than the first reporting group in program buffer 522 is made, the G bit 920 is set to one if the run-time-instrumentation-halted condition does exist, and the reporting group is not stored.

The U bit 922 is the enablement control for a buffer-full interruption and a halted interruption. When U bit 922 is zero, generation of an interruption request is disabled and, if pending, remains pending.

The L bit 924 is the pending control of a buffer-full interruption. When L bit 924 is zero, a buffer-full interruption is not pending. When L bit 924 is one, a buffer-full interruption is pending.

The key field 926 is a 4-bit unsigned integer whose value is used as a storage-protect key for the store of a reporting group. A store of a reporting group is permitted only when the storage key matches the access key associated with the request for storage access, and a fetch is permitted when the storage key matches the access key or when a fetch-protection bit of the storage key is zero. The keys match when the four access control bits of the storage key are equal to the access key, or when the access key is zero.

Figure 10:
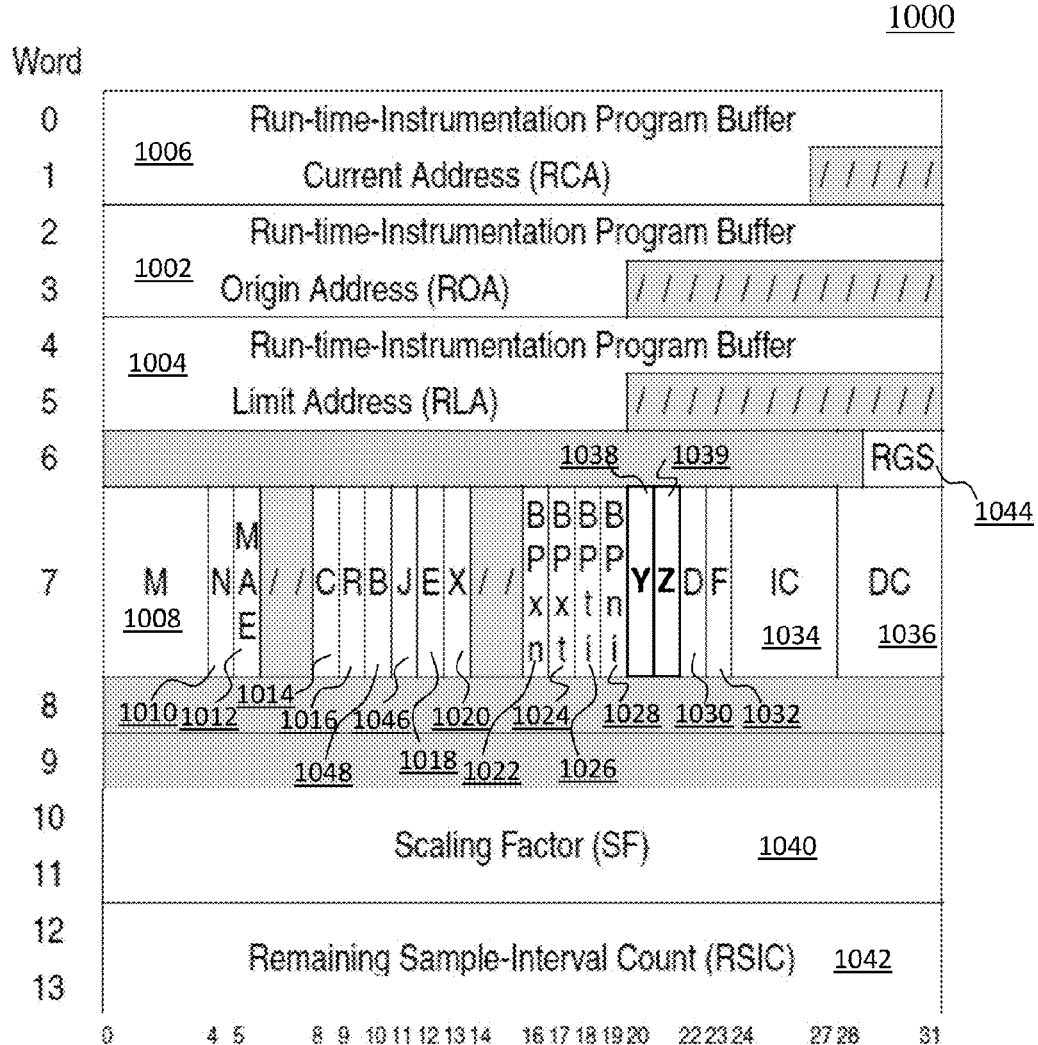
FIG. 10 depicts a portion of an RICCB control block when the semi-privileged bit (K) is set to 1 in an embodiment.

FIG. 10 depicts a portion of an RICCB control block when MRIC is permitted to execute in semi-privileged mode (i.e., K bit is one). The control block 1000 may include additional values other than those described in reference to FIG. 10. In an embodiment, any grayed out sections of the MRIC instruction operand are not accessible by a lesser-privileged state program. When the semi-privileged mode is permitted, the origin address (ROA) 1002 and the limit address 1004 are set with the MRIC instruction by the lesser-privileged state program.

In an embodiment, a current address field (RCA) 1006 may be updated by the MRIC instruction. The current address field 1006 examines the reporting group size field 1044 (RGS field) and affects the number of significant bit positions used to form the address of the program buffer. The 64-bit run-time-instrumentation program buffer current address is word 0, bit positions 0 through 26-RGS of word 1, and RGS+5 binary zeros appended on the right. This is the starting location in the program buffer 522 of FIG. 5 of a subsequent reporting group that will be stored in the program buffer 522. The reporting group is a unit of information that is created by the instrumentation module 506, and subsequently stored in the program buffer 522. In an embodiment, when the RGS field 1044 specified by the current address field 1006 is not equal to the run-time-instrumentation control's current reporting group size (i.e. the current address field 1006 would change the RGS field 1044) then the current address field 1006 is set to the origin address 1002.

A remaining sample interval count field 1042 (RSIC field) may be updated by the lesser-privileged program using the MRIC instruction. The RSIC field 1042 includes a 64-bit unsigned integer that indicates a remaining sample interval count. When the value of the RSIC field 1042 in the run-time-instrumentation controls is zero or equal to the value in a scaling factor field 1040 (SF field), and run-time-instrumentation is enabled, then the next sample interval is a full interval based on the sampling mode field 1008 (M field) and SF field 1040 values. When RSIC field 1042 is nonzero and less than the SF field 1040 and run-time-instrumentation is enabled, the next sample interval is a partial interval. When the RSIC field 1042 is nonzero and greater than the SF field 1040 value and run-time-instrumentation is enabled, the next sample interval is an extended interval. When an extended interval expires, the next interval is based on the SF field 1040 value. When the RSIC field 1042 is set to a nonzero value, it is subject to the same model-dependent maximum limit to which the SF field 1040 is also subject. When the original value of the RSIC field 1042 is zero, the sampling mode will dictate whether the RSIC field 1042 is set to the value in the SF field 1040 during execution of LRIC and MRIC instructions, or whether it continues to show as zero until run-time-instrumentation is enabled.

The SF field 1040 contains a 64-bit unsigned integer whose value is a scaling factor count of units. The dimension of the units is determined from the sampling mode field 1008 (M field). When the value in the RSIC field 1042 is zero, the SF field 1040 provides an initial value of the RSIC field 1042 that is decremented to zero at which point the current instruction is recognized as a sample instruction, and the interval count is refreshed from the SF field 1040 value. A valid value of the SF field 1040 is in the range one to $2^{64}-1$. If zero is specified, a value of one is assumed. However, each model may have both a minimum and a maximum value of the SF field 1040. The minimum and maximum values may also be different based on the sampling mode field 1008. If a value less than the minimum is specified, the model-dependent minimum value is loaded. If a value greater than the maximum value is specified, the model-dependent maximum value is loaded.

The DC control field 1036 is a 4-bit unsigned integer whose value designates a cache-latency level associated with a data fetch or store cache miss. That is, the sample instruction encountered a data access cache miss. Unless prohibited by another run-time-instrumentation control, an attempt is made to store a reporting group representing the sample instruction whose data access recognized a miss at a cache-latency level numerically greater than or equal to the level designated by the value of the DC control field 1036. The cache structure and cache-latency level for data access is model dependent. For an instruction with multiple or long operands, it is model dependent which, if any, operand access is used for reporting control. Model-dependent behavior may ignore the value of the DC control field 1036 and thus not use it as a reason to store a reporting group.

The IC field 1034 is a 4-bit unsigned integer whose value designates a cache-latency level associated with an instruction-fetch cache miss. That is, the fetch of the sample instruction encountered an instruction-fetch cache miss. For both the IC field 1034 and DC control field 1036, a cache-latency level is an abstraction of how far a certain cache level access is from the observing processor. The latency level depends on the combination of the amount of nested cache levels between the processor and main storage, and how such cache levels are shared among multiple processors. A larger latency level generally corresponds to a more time-consuming access. Values in the IC field 1034 and DC control field 1036 may be thought of as zero-origin identification of a cache-latency level. For example, a value of zero corresponds to an L1 cache (i.e., the cache that is closest to the processor). A value of one is therefore the next layer of cache which may be known as an L2 cache, or even an L1.5 cache in some machines. Values of 2-15 designate the logical progression of additional cache-latency layers until main memory is reached, but not including main memory itself. Generally, cache structures do not go as deep as fifteen layers. Therefore, a value of 15 in the IC field 1034 and DC control field 1036 is interpreted as a special case, meaning that a cache miss on instruction fetch or data access, respectively and regardless of cache-latency level, is not recognized for the purpose of generating the store of a reporting group. Unless prohibited by another run-time-instrumentation control, an attempt is made to store a reporting group representing the sample instruction whose fetch recognized a miss at a cache-latency level numerically greater than or equal to the level designated by the value of the IC field 1034. The cache structure and cache-latency level for instruction fetching is model dependent. Model-dependent behavior may ignore the value of the IC field 1034 and thus not use it as a reason to store a reporting group.

The cache-latency-level-override reporting control bit 1032 (F bit) is for non-branch instructions and for branch-prediction controls. When the F bit 1032 in the run-time-instrumentation controls is zero, the cache-reporting controls (IC field 1034 and DC control field 1036) of the run-time-instrumentation controls are checked and used according to their defined function. The branch-prediction controls (BPxn 1022, BPxt 1024, BPti 1026, and BPni 1028 bits) of the run-time-instrumentation controls are checked and used according to their defined function. When the F bit 1032 is one, these same controls are ignored and a reporting group is stored unless prohibited by another control.

The data-cache-miss control bit 1030 (D bit) indicates if a reporting group is to be stored. If the D bit 1030 is one, an extra type record may or may not be placed in the extra section of the reporting group which contains model dependent data about the sample instruction.

The MRIC instruction includes branch-prediction (BP) reporting controls (BPxn 1022, BPxt 1024, BPti 1026, and BPni 1028). If a BP reporting control bit in the run-time-instrumentation controls is zero, the corresponding condition is not checked. If a BP reporting-control bit is one and the corresponding branch-prediction condition exists, and a reporting group is stored.

The BPxn bit 1022, when one, enables checking of branch-prediction information. Thus, if the sample branch is incorrectly predicted to be taken but is not taken, a reporting group is stored.

The BPxt bit 1024, when one, enables checking of the branch-prediction information. Thus, if the sample branch is incorrectly predicted to be not taken but is taken, a reporting group is stored.

The BPti bit 1026, when one, enables checking of the branch-prediction information. Thus, if the sample branch is correctly predicted to be taken, and is taken, but the branch target is incorrectly predicted, a reporting group is stored.

The BPni bit 1028, when one, enables checking of the branch-prediction information. Thus, if the sample branch is correctly predicted to not be taken, and is not taken, and the branch target is incorrectly predicted, a reporting group is stored.

The enablement control of transactional-execution-mode records bit 1020 (X bit) controls the collection of transactional-execution-mode abort records. When the X bit 1020 in the run-time-instrumentation controls is zero, transactional-execution-mode abort records are not collected. When the X bit 1020 is one, transactional-execution mode abort records are collected and placed in the collection buffer 508 of FIG. 5. If a model does not have a transactional-execution facility installed, the X bit 1020 is ignored.

The RIEMIT instruction control bit 1018 (E bit) controls the execution of the RIEMIT instruction. When the E bit 1018 in the run-time-instrumentation controls is zero or ignored and treated as zero when run-time-instrumentation is enabled, RIEMIT executes a no-operation. When E bit 1018 is one, and not otherwise ignored, RIEMIT is enabled to execute its defined function.

The J bit 1046 when zero, specifies that the branch on condition (BC) instruction is in the other-type branch category, regardless of mask value. If the J bit 1046 is one, the BC instruction which specifies a mask of 15 is in the return-type branch category. When the BC instruction specifies a mask of 1-14, it is not affected by the J bit 1046 and is always in the other type branch category. When in the return-type branch category, the R bit 1016 controls inclusion into the collection buffer 508 of FIG. 5. When in the other type branch category, the B bit 1048 controls inclusion into the collection buffer 508. The other-type branch category may also be indicated as the transfer-type branch category.

The instruction address code bit 1014 (C bit) controls the enablement of call type branches. If the C bit 1014 in the run-time-instrumentation controls is one and the instruction is a call-type branch, the collection buffer is updated. If model-dependent detection of both call-type and return-type branches is combined, the C bit 1014 operates on both types and the R bit 1016 is not effective.

The R bit 1016 is the enablement control of return-type branches. If the R bit 1016 in the run-time-instrumentation controls is one and the instruction is a return-type branch, then the collection buffer 508 is updated.

The B bit 1048 is the enablement control of branches other than call-type and return-type branches. If the B bit 1048 in the run-time-instrumentation controls is one and the instruction is an other-type branch recognized by run-time-instrumentation, then the collection buffer 508 is updated.

The maximum-address exceeded bit 1012 (MAE bit), if set to 1, indicates that, one or more reporting groups have been stored that have an instruction address code (C field) set to one. Once the MAE bit 1012 is set to one, continuing execution of run-time-instrumentation does not set it back to zero. Execution of the LRIC instruction or the MRIC instruction which specifies the MAE bit as zero will set the MAE bit to zero.

The run-time-instrumentation next (RINEXT) control bit 1010 (N bit) controls the enablement of the run-time-instrumentation next instruction, which controls the execution of a sample instruction. When the N bit 1010 in the run-time-instrumentation controls is zero or ignored and treated as zero, RINEXT executes a no-operation. When the N bit 1010 is one, and not otherwise ignored, RINEXT is enabled to execute its defined function.

The sampling mode field 1008 (M field) is a 4-bit unsigned integer whose value in the run-time-instrumentation controls specifies the sampling mode for the run-time-instrumentation controls.

The reporting group size field 1044 (RGS) is a 3-bit unsigned integer whose value specifies the number of records of a reporting group (RRG). The number of records in a reporting group may vary from two records, including a begin/timestamp record and an instruction last record, up to two hundred fifty-six records. In an embodiment, the upper limit may be model dependent. The number of 16-byte records placed into a reporting group is $2^{(RGS+1)}$.

The primary-CPU capability suppression control bit 1038 (Y bit) and the secondary-CPU capability suppression control bit 1039 (Z bit) are collectively referred to as the suppression control. Suppression of the storing of a reporting group means that an attempt to store is not performed. The suppression control is not effective and no suppression occurs when the CPU capability of all CPUs in the configuration is the same. In a configuration, if the CPU capability of a CPU differs from the capability of another CPU, the suppression control is in effect, and at least one CPU is said to be operating at the CPU capability or primary-CPU capability while at least one other CPU is said to be operating at the secondary-CPU capability. The primary and secondary CPU capabilities are different operating speeds. When Y bit 1038 and Z bit 1039 are both zero, suppression does not occur. When Y bit 1038 is zero and Z bit 1039 is one, suppression occurs if the CPU, e.g., processor 106, is operating at the secondary-CPU capability. When Y bit 1038 is one and Z bit 1039 is zero, suppression occurs if the CPU, e.g., processor 106, is operating at the primary-CPU capability. When Y bit 1038 and Z bit 1039 are both one, suppression occurs.

The above fields and bits of FIG. 10 are an example of the placement and naming of the fields and are provided herein for purposes of clarity. It will be understood that in other embodiments the only a subset of the fields may be used, fields may be in any order or position, and/or may be signified by different names.

As described previously, when run-time instrumentation is enabled during program execution, run-time-instrumentation data is collected within the processor 106 in the collection buffer 508. In an embodiment, the collection buffer 508 is an internal buffer of the processor 106 that is used to save the most recent records collected. When a sample trigger point is detected, the records are copied from the collection buffer 508 into the program buffer 522 as part of a reporting group that is written to the program buffer 522. In an embodiment, the records are copied from the collection buffer 508 in a non-destructive manner.

The collection buffer 508 may be referred to as a "hardware collection buffer" because the collection buffer 508 is located in the processor and in an embodiment implemented as an array of register pairs for storing an instruction address and event metadata for a given event. An example of an event is a taken branch for which the register pair may hold the instruction address of the branch, and the metadata may hold the target of the branch as well as information regarding the historic behavior of the branch. In an embodiment, the register pairs are ordered and updated sequentially as events occur in the instruction stream. A counter is maintained to indicate the index of the most recently updated entry in the array. In an embodiment the collection buffer 508 is a circular buffer, and when the collection buffer 508 is full, the next event overwrites the first entry in the array, and sequential updating of the array's register pairs re-starts on subsequent events. As such, assuming an array CB[0] to CB[N−1] and a counter i indicating the latest updated index, the trace of events captured would be represented by the sequence CB[i], CB[i−1] . . . CB[1], CB[0], CB[N−1], CB[N−2] . . . CB[i+1]. In another embodiment, two pointers are used: a head pointer pointing to the oldest entry in the buffer, and a tail/current pointer pointing to the newest entry in the buffer.

Events that represent a state of the processor 106 at any given execution point are captured sequentially in the collection buffer 508. The collection buffer 508 is used to capture a set of records whose contents report on events recognized by the processor 106 during program execution (e.g., execution of one or more taken branches, transactional-execution abort events, the operand of a RIEMIT instruction, etc.). In an embodiment the events recognized depend on the contents of the RICCB shown in FIG. 10. Entries in the embodiment of the collection buffer 508 shown include an event instruction address and other relevant event metadata. Examples of event metadata include, but are not limited to: the instruction address of a taken branch and its target including some information about the historic behavior of the branch; the instruction address of a RIEMIT instruction and a respective register value; and the address of a transaction abort instruction and a respective transaction recovery entry point.

An embodiment of the collection buffer 508 stores up to thirty-two entries (i.e., information about thirty-two events), with each instruction address specified by sixty-four bits (e.g., bits 0:63), and event metadata by sixty-four bits (e.g., bits 64:127). The size of the collection buffer (RCB) is a model dependent count, representing a number of records. In an embodiment, the byte size of the collection buffer 508 is a multiple of a sixteen byte record size. The size of the collection buffer (RCB) is a number of records greater than or equal to the difference between the count of the largest reporting group (RRG) of the model and the count of the records in a reporting group that are not acquired from the collection buffer (RNC). Thus, in an embodiment, the size of the collection buffer is expressed as: RCB≤(RRG−RNC).

In an embodiment, contents of the collection buffer 508 and the instruction data buffer (if one is used) are purged or otherwise affected by the following events: (1) an interruption; (2) the PSW bit that turns on and off the run-time instrumentation facility (e.g., bit 24) changes from a one to a zero; and (3) when a sample instruction is identified when the run-time instrumentation facility is in a transactional-execution mode (in this case, further update of the collection data buffer 508 and instruction-data buffer stops and resumes when the transaction ends, at which time, a store of the reporting group is pending and the collection buffer 508 and instruction-data buffers are purged).

In an embodiment, such as the emulated host computer system shown in FIG. 1B, the collection buffer 508 is implemented using registers and/or memory. In this embodiment, the optional instruction-data buffer, if present, is also implemented using registers and/or memory.

In embodiments, additional capabilities can effect data collection and may be viewed as providing additional data-collection points while not substantially disturbing the regular instruction-count or cycle-count sampling described previously. These include execution of a RIEMIT instruction, which collects the value of a general register by storing it into the collection buffer 508. In addition, the data-collection control bits in the run-time instrumentation controls described previously can be used to customize the types of data collected (e.g., the E, C, R, and B control bits). In this manner, the type of data collected is programmable.

In an embodiment, an instruction-data buffer is implemented to collect model dependent sample instruction data that is used to construct a run-time-instrumentation instruction record. The instruction-data buffer collects data from an instruction in anticipation of being available when the instruction is identified as a sample instruction. In an embodiment, the instruction-data buffer is a hardware buffer/storage location in the processor where information about an instruction that would become a trigger as a sample point is saved, so that during the log out process, it can be written out together with data from the collection buffer 508. Similar to the collection buffer 508 it includes the instruction address, and meta-data associated with that instruction. The metadata in the instruction-data buffer is often machine dependent and may include, but is not limited to: cache miss related information, and branch prediction related information.

In accordance with embodiments, other data collected may not be from the collection buffer 508 and not from the instruction-data buffer. Examples include data used to form parts of the following: (1) the first record of a reporting group: timestamp or begin record; and (2) additional types of records may be created for every reporting group and thus not stored in the collection buffer 508, such records, when present, may be placed in the extra or machine-dependent section of a reporting group. These records are referred to herein as "system information records."

Figure 11:
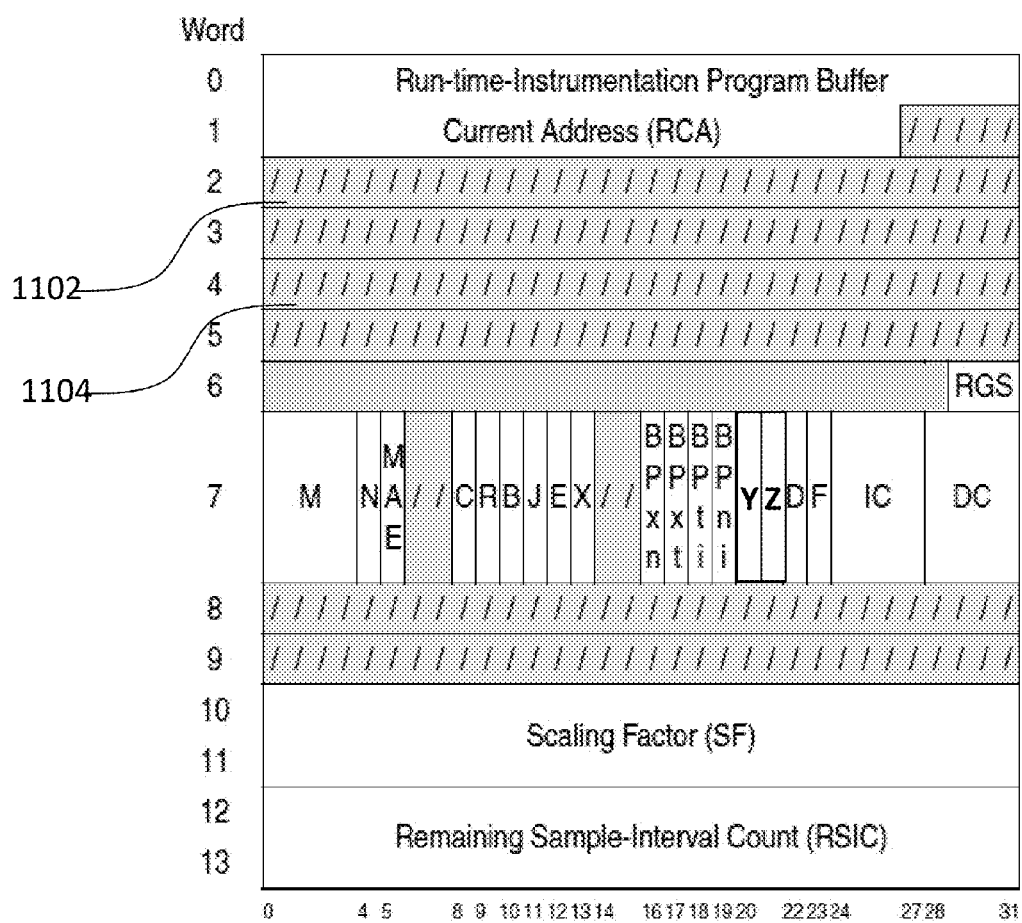
FIG. 11 depicts a portion of an RICCB control block when the semi-privileged bit (K) is set to 0 in an embodiment.

FIG. 11 depicts a portion of an RICCB control block when MRIC is not permitted to execute in semi-privileged mode (i.e., K bit is zero). The control block 1100 may include additional values other than those described in reference to FIG. 11. When the semi-privileged mode is not permitted, the origin address section 1102 and the limit address section 1104 are not used and the current values not modified by the lesser-privileged state program.

In an embodiment, only a subset of all of the run-time-instrumentation control settings are updated by the successful execution of the MRIC instruction by the lesser-privileged state program.

When the RICCB is fetched, a number of errors may be encountered. In addition, if the address of the RICCB in the MRIC instruction is not aligned properly then an exception is encountered. Similarly, if the address in the MRIC instruction is inaccessible, either because of an error state, or an invalid address, then an exception is encountered. If during the execution of the MRIC instruction it is determined that the RICCB values conflict in any defined way (i.e. they are internally inconsistent) an exception is also encountered.

In an embodiment, a special-operation exception is recognized for any of the following reasons: an MRIC instruction is issued and run-time-instrumentation is enabled; the current run-time controls are not valid; and/or the processor is in the lesser-privileged state and the run-time-instrumentation stopped bit in the current run-time-instrumentation controls is zero.

In an embodiment, a specification exception is recognized for any of the following reasons: the storage operand of MRIC is not aligned on a doubleword boundary; the processor is in the supervisor state or the K bit in the current run-time-instrumentation controls is one and any of the following conditions is recognized: the specified limit address is less than the specified origin address; the specified current address is less than the specified origin address; and the specified current address is greater than the sum of one plus the specified generated limit address; and the processor is in the lesser-privileged state, the k bit in the current RI controls is zero and any of the following conditions is recognized: the specified current address is less than the current origin address; the specified current address is greater than the sum of one plus the current limit address; an invalid mode is specified.

In an embodiment, an MRIC instruction that is defined for a particular processor of one architecture may be executed by a second processor of a different architecture. In an embodiment, the second processor identifies a software based emulation routine, and executes the MRIC instruction using the software based emulation routine.

FIG. 12 depicts a high-level example of a reporting group 1200 stored to program buffer 522 at a sample point. The size of a reporting group in records is represented by $R_{RG}$, equals $2^{(RGS+1)}$, where RGS is the reporting group size as an exponent. A model-dependent number of records ($R_{NC}$) copied from a location other than the collection buffer 508 may or may not be copied non-destructively when used in a reporting group. In the example of FIG. 12, $R_{RG}=8$, $R_{GS}=2$, and $R_{NC}=4$. The example reporting group 1200 shown in FIG. 12 includes a header section 1202, a body section 1204, an extra records section 1206, and a footer section 1208.

The header section 1202 may include a begin record or a timestamp record to hold status, tracking, and/or timing information. A begin record is stored in the header section 1202 for the first reporting group stored in a program buffer (i.e., when the RCA 1006 is equal to the ROA 1002). In an embodiment, the begin record includes a record type field of "02", a number of reporting groups (NRG) field for indicating how many reporting groups are currently stored in the program buffer, a RGS field to indicate the size of the reporting groups, a stopped (S) field for indicating whether or not the program buffer 522 is full, a halted (H) field for indicting whether the run-time instrumentation is halted, and a time of day (TOD) clock field for indicating when the begin record was written. In an embodiment, at least a subset of the fields in the begin record are sourced from the RI control block (e.g., RICCB). An embodiment of the timestamp record has a record type of "03" and includes a TOD clock field for indicating when the record was stored. In an embodiment, a timestamp record is stored in the header section 1202 for each reporting group other than the first reporting group.

The body section 1204 of the reporting group may include a variety of records for events and information sampled from collection buffer 508. Events and information may represent, for example, state information captured by an emit instruction, a transactional-execution abort, a call, a return, a branch, and filler.

In an embodiment, an emit record is created and stored in the collection buffer 508 upon a successful execution of a RIEMIT instruction. An embodiment of the emit record includes a record type field of "10", an instruction address code field to indicate how the instruction address bit positions of the current PSW are represented in the emit record, an instruction address field which varies depending on the addressing mode (e.g., 64, 31 or 24 bit) and contains the instruction address of the RIEMIT instruction or execute type instruction if the RIEMIT was the target of an execute type instruction, and an emit data field for storing the data from the general register specified by the RIEMIT instruction.

In an embodiment, a transactional execution mode abort record is created and stored in the collection buffer 508 by either an implicit abort or by execution of a transaction abort instruction. An embodiment of the abort record includes a record type field of "11", an instruction address code field to indicate how the instruction address bit positions of the current PSW are represented in the transactional-execution abort record, an instruction address field which varies depending on the addressing mode (e.g., 64, 31 or 24 bit) and contains the instruction address of the aborted instruction or execute type instruction if the aborted instruction was the target of an execute type instruction, and a field for any model dependent data associated with the abort.

In an embodiment, a call record is created by execution of a call type branch instruction, such as: BRANCH AND SAVE (BASR) when the R2 field is nonzero, BRANCH AND SAVE (BAS), BRANCH RELATIVE AND SAVE LONG, BRANCH RELATIVE AND SAVE, BRANCH AND LINK (BALR) when the R2 field is nonzero, BRANCH AND LINK (BAL), and BRANCH AND SAVE AND SET MODE when the R2 field is nonzero. An embodiment of the call record includes a record type field of "12", an instruction address code field to indicate how the instruction address bit positions of the current PSW are represented in the call record, an instruction address field which varies depending on the addressing mode (e.g., 64, 31 or 24 bit) and contains the address of the branch instruction or execute type instruction if the branch instruction was the target of an execute type instruction, and a well behaved field for indicating whether or not the branch was correctly predicted, and a target address field containing the branch target address (also referred to as the "called location").

Return records and transfer records may have the same format as the call records. In an embodiment, a return record has a record type field of "13" and is created by execution of a return type branch instruction such as a BRANCH ON CONDITION (BCR) when the R2 field is nonzero and the mask is 15. For the return record, the instruction address field contains the address of the branch instruction or execute type instruction if the branch is the target of an execute type instruction, and the target address field contains the return location.

In an embodiment, a transfer record has a record type field of "14" and is created by execution of a return type branch instruction such as: a. BRANCH ON CONDITION (BCR) when the R2 field is nonzero and the mask is in the range 1-14; b. BRANCH ON CONDITION (BC) when the J bit is zero or the mask is in the range 1-14; c. BRANCH ON COUNT (BCT, BCTR, BCTG, BCTGR); d. BRANCH ON INDEX HIGH (BXH, BXHG); e. BRANCH ON INDEX LOW OR EQUAL (BXLE, BXLEG); f. BRANCH RELATIVE ON CONDITION (BRC); g. BRANCH RELATIVE ON CONDITION LONG (BRCL); h. BRANCH RELATIVE ON COUNT (BRCT, BRCTG); i. BRANCH RELATIVE ON COUNT HIGH (BRCTH); j. BRANCH RELATIVE ON INDEX HIGH (BRXH, BRXHG); k. BRANCH RELATIVE ON INDEX LOW OR EQUAL (BRXLE, BRXLG); l. COMPARE AND BRANCH (CRB, CGRB); m. COMPARE AND BRANCH RELATIVE (CRJ, CGRJ); n. COMPARE IMMEDIATE AND BRANCH(CIB, CGIB); o. COMPARE IMMEDIATE AND BRANCH RELATIVE (CIJ, CGIJ); p. COMPARE LOGICAL AND BRANCH(CLRB, CLGRB); q. COMPARE LOGICAL AND BRANCH RELATIVE (CLRJ, CLGRJ); r. COMPARE LOGICAL IMMEDIATE AND BRANCH (CLIB, CLGIB); and s. COMPARE LOGICAL IMMEDIATE AND BRANCH RELATIVE (CLIJ, CLGIJ). The transfer record is created when the branch is taken. For the transfer record, the instruction address field contains the address of the branch instruction or execute type instruction if the branch is the target of an execute type instruction, and the target address field contains the return location.

A filler record is used in a reporting group when the number of valid records in the collection buffer 508 is not sufficient to fill a reporting group of the current RGS. An embodiment of a filler record includes record type field of "00" to indicate that the record is a filler record and the remaining bytes are undefined.

The extra records section 1206, when present, may contain model-dependent records. In an embodiment, the format of an extra record is similar to the filler record except for the record type is set to "01" to indicate that the record is an extra record and the remaining bytes of the extra record may contain model dependent data.

The footer section 1208 can include an instruction record containing information about execution of a sample instruction. An instruction record is created when a reporting group is stored for a sample instruction. An embodiment of the instruction record includes a record type field of "04", an instruction address code field to indicate how the instruction address bit positions of the current PSW are represented in the instruction record, an instruction address field which varies depending on the addressing mode (e.g., 64, 31 or 24 bit) and contains the instruction address of the sample instruction or execute type instruction if the sample instruction was the target of an execute type instruction, and an instruction-data buffer (IDB) field containing any model dependent data collected from the IDB.

Figure 13:
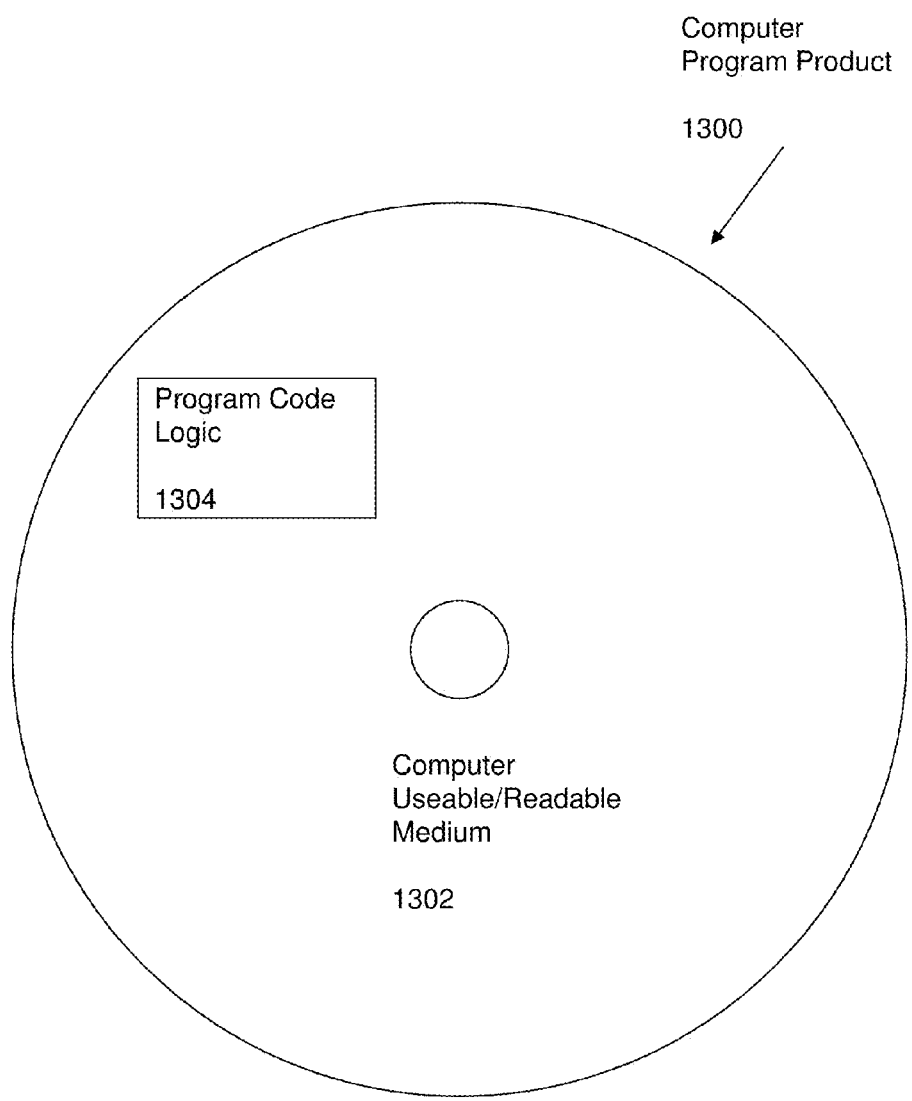
FIG. 13 illustrates a computer program product in an embodiment.

As described above, embodiments can be embodied in the form of computer-implemented processes and apparatuses for practicing those processes. An embodiment may include a computer program product 1300 as depicted in FIG. 13 on a computer readable/usable medium 1302 with computer program code logic 1304 containing instructions embodied in tangible media as an article of manufacture. Exemplary articles of manufacture for computer readable/usable medium 1302 may include floppy diskettes, CD-ROMs, hard drives, universal serial bus (USB) flash drives, or any other computer-readable storage medium, wherein, when the computer program code logic 1304 is loaded into and executed by a computer, the computer becomes an apparatus for practicing the invention. Embodiments include computer program code logic 1304, for example, whether stored in a storage medium, loaded into and/or executed by a computer, or transmitted over some transmission medium, such as over electrical wiring or cabling, through fiber optics, or via electromagnetic radiation, wherein, when the computer program code logic 1304 is loaded into and executed by a computer, the computer becomes an apparatus for practicing the invention. When implemented on a general-purpose microprocessor, the computer program code logic 1304 segments configure the microprocessor to create specific logic circuits.

Technical effects and benefits include an MRIC instruction that is executable by a lesser-privileged state program to modify run-time-instrumentation settings at runtime from the lesser-privileged state.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or schematic diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, embodiments can be embodied in the form of computer-implemented processes and apparatuses for practicing those processes. In embodiments, the invention is embodied in computer program code executed by one or more network elements. Embodiments include a computer program product on a computer usable medium with computer program code logic containing instructions embodied in tangible media as an article of manufacture. Exemplary articles of manufacture for computer usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention. Embodiments include computer program code logic, for example, whether stored in a storage medium, loaded into and/or executed by a computer, or transmitted over some transmission medium, such as over electrical wiring or cabling, through fiber optics, or via electromagnetic radiation, wherein, when the computer program code logic is loaded into and executed by a computer, the computer becomes an apparatus for practicing the invention. When implemented on a general-purpose microprocessor, the computer program code logic segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for executing a modify runtime instrumentation controls (MRIC) instruction, the MRIC instruction executable in either a supervisor state or a lesser-privileged state, the MRIC instruction for setting only a subset of run-time-instrumentation controls, wherein all of said run-time-instrumentation controls are loadable by a privileged load run-time-instrumentation controls (LRIC) instruction, the computer program product comprising:
- a non-transitory storage medium readable by a processing circuit and storing instructions for execution by the processing circuit for performing a method comprising:
  - fetching the MRIC instruction, the MRIC instruction including an address of a run-time-instrumentation control block (RICCB);
  - fetching, by a processor, the RICCB, the RICCB including a plurality of values for modifying said subset of run-time-instrumentation controls of the processor, the plurality of values of the RICCB comprising:
    - a runtime instrumentation program buffer current address (RCA) of a runtime instrumentation program buffer (RIB) location, the RIB for holding runtime instrumentation information of events recognized by the processor during program execution; and
    - one or more of:
      - a control to manage details of run-time-instrumentation data sampling;
      - a control to manage details of run-time-instrumentation data collection;
      - a control to manage details of run-time-instrumentation data reporting into a program buffer;
      - a control to manage detection of instruction-cache misses;
      - a control to manage detection of data-cache misses;
      - a control to manage a size of a reporting group;
      - a control to manage a current address within an output program buffer at which a next reporting group is stored;
      - controls to manage data collection of data on call-type, return-type, and transfer-type branches; and
      - controls to manage data collection of branches that are correctly or incorrectly predicted as taken or not taken;
  - loading the plurality of values into the run-time-instrumentation controls; and
  - using the loaded plurality of values to provide run-time-instrumentation event information to the RIB.

2. The computer program product according to claim 1, further comprising:
- deriving a model dependent limited value for at least one of the plurality of values of the RICCB; and
- loading the model dependent limited value as an updated value into the run-time-instrumentation controls.

3. The computer program product according to claim 2, wherein based on one of the plurality of values of the RICCB being the control to manage a size of a reporting group, the method further comprises:
- loading the model dependent limited value;
- based on a K field of the run-time-instrumentation controls having a first value, setting a current address to a value of an origin address of the RICCB; and
- based on the K field of the run-time-instrumentation controls having a second value, setting the current address to a value of a specified RICCB current address value.

4. The computer program product according to claim 1, further comprising causing an exception, based on any one or more of:
- determining that the address in the MRIC instruction does not align with a double word boundary; and
- determining that the RICCB cannot be fetched from the address included in the MRIC instruction.

5. The computer program product according to claim 1, further comprising:
- determining that one or more values in the RICCB are valid, wherein the determining further comprises any one of:
  - determining that a run-time-instrumentation S bit indicates that execution of the MRIC instruction from the lesser-privileged state is not permitted;
  - determining that the run-time-instrumentation controls are not valid; and
  - determining that run-time-instrumentation is not enabled.

6. The computer program product according to claim 1, wherein the MRIC instruction is defined for a first computer architecture, and the fetching and parsing is executed by a second processor of an alternate computer architecture, the fetching and parsing by the second processor comprising:
- identifying a software routine for emulating execution of the MRIC instruction on the first computer architecture; and
- executing the MRIC instruction with the software routine.

7. The computer program product according to claim 1, wherein no values in the run-time-instrumentation controls are updated if an error is encountered.

8. A computer system for executing a modifying run-time-instrumentation controls (MRIC) instruction from either a supervisor state or a lesser-privileged state, the MRIC instruction for setting only a subset of run-time-instrumentation controls, wherein all of said run-time-instrumentation controls are loadable by a privileged load run-time-instrumentation controls (LRIC) instruction comprising:
- a computer processor comprising a run-time-instrumentation module, the run-time-instrumentation module configured to perform a method comprising:
  - fetching the MRIC instruction, the MRIC instruction including an address of a run-time-instrumentation control block (RICCB);
  - fetching the RICCB, the RICCB including a plurality of values for modifying said subset of run-time-instrumentation controls of the computer processor, the plurality of values of the RICCB comprising:
    - a runtime instrumentation program buffer current address (RCA) of a runtime instrumentation program buffer (RIB) location, the RIB for holding runtime instrumentation information of events recognized by the computer processor during program execution; and
    - one or more of:
      - a control to manage details of run-time-instrumentation data sampling;
      - a control to manage details of run-time-instrumentation data collection;
      - a control to manage details of run-time-instrumentation data reporting into a program buffer;
      - a control to manage detection of instruction-cache misses;
      - a control to manage detection of data-cache misses;
      - a control to manage a size of a reporting group;
      - a control to manage a current address within an output program buffer at which a next reporting group is stored;
      - controls to manage data collection of data on call-type, return-type, and transfer-type branches; and
      - controls to manage data collection of branches that are correctly or incorrectly predicted as taken or not taken;

loading the plurality of values into the run-time-instrumentation controls; and using the loaded plurality of values to provide run-time-instrumentation event information to the RIB.

9. The system according to claim 8, further comprising:
deriving a model dependent limited value for at least one of the plurality of values of the RICCB; and
loading the model dependent limited value as an updated value into the run-time-instrumentation controls.

10. The system according to claim 9, wherein based on one of the plurality of values of the RICCB being the control to manage a size of a reporting group, the method further comprises:
loading the model dependent limited value;
based on a K field of the run-time-instrumentation controls having a first value, setting a current address to a value of an origin address of the RICCB; and
based on the K field of the run-time-instrumentation controls having a second value, setting the current address to a value of a specified RICCB current address value.

11. The system according to claim 8, further comprising causing an exception, based on any one or more of:
determining that the address in the MRIC instruction does not align with a double word boundary; and
determining that the RICCB cannot be fetched from the address included in the MRIC instruction.

12. The system according to claim 8, further comprising:
determining that one or more values in the RICCB are valid, wherein the determining further comprises any one of:
determining that a run-time-instrumentation S bit indicates that execution of the MRIC instruction from the lesser-privileged state is not permitted;
determining that the run-time-instrumentation controls are not valid; and
determining that run-time-instrumentation is not enabled.

13. The system according to claim 8, wherein the MRIC instruction is defined for a first computer architecture, and the fetching and parsing is executed by a second processor of an alternate computer architecture, the fetching and parsing by the second processor comprising:
identifying a software routine for emulating execution of the MRIC instruction on the first computer architecture; and
executing the MRIC instruction with the software routine.

14. The system according to claim 8, wherein no values in the run-time-instrumentation controls are updated if an error is encountered.

* * * * *